April 21, 1953  E. W. FLINT  2,635,807
AUTOMATIC ACCOUNTING DEVICE
Filed June 24, 1949  20 Sheets-Sheet 1

INVENTOR
E. W. FLINT
BY John A. Hall
ATTORNEY

April 21, 1953  E. W. FLINT  2,635,807
AUTOMATIC ACCOUNTING DEVICE
Filed June 24, 1949  20 Sheets-Sheet 2
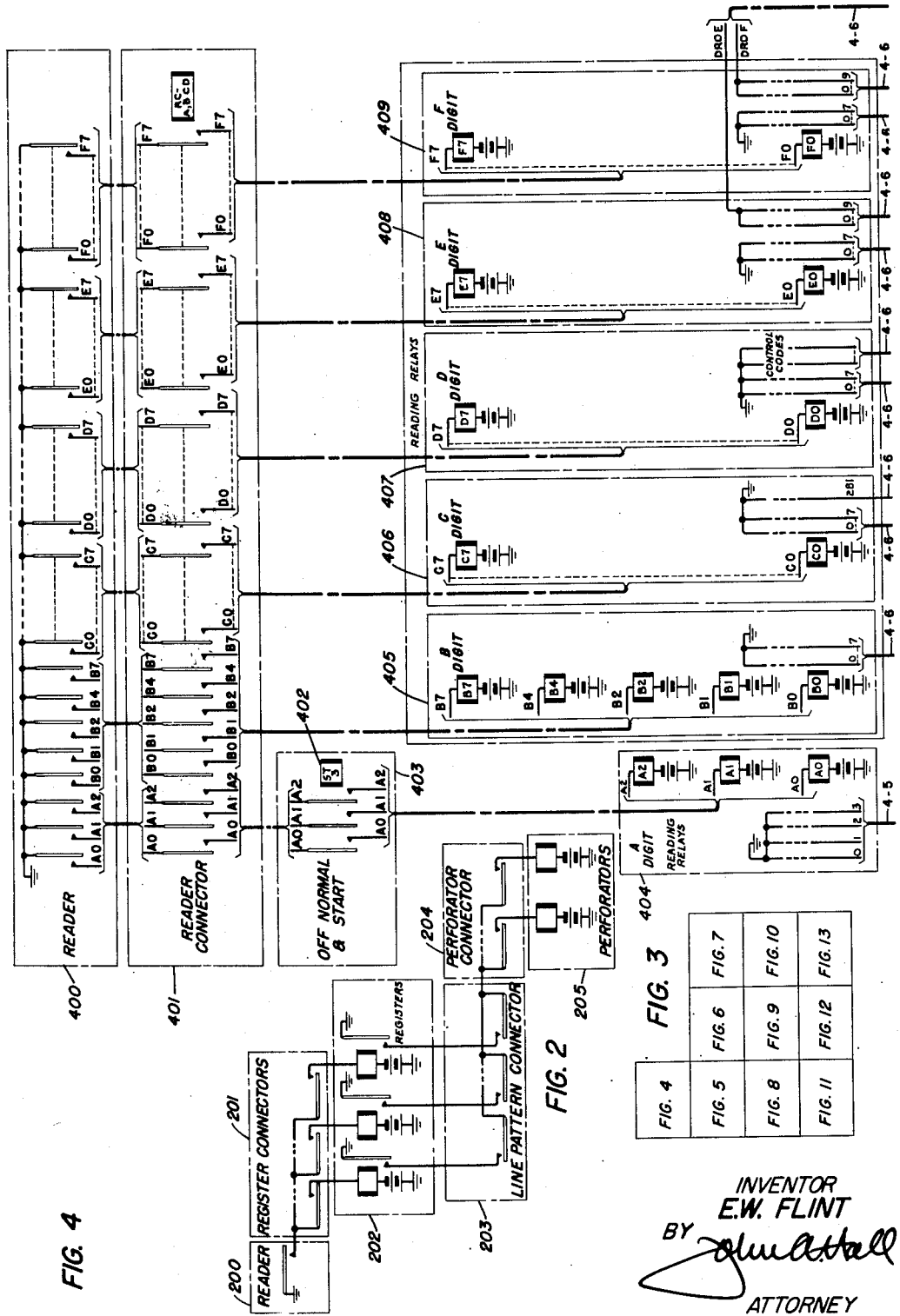
INVENTOR
E.W. FLINT
BY
ATTORNEY

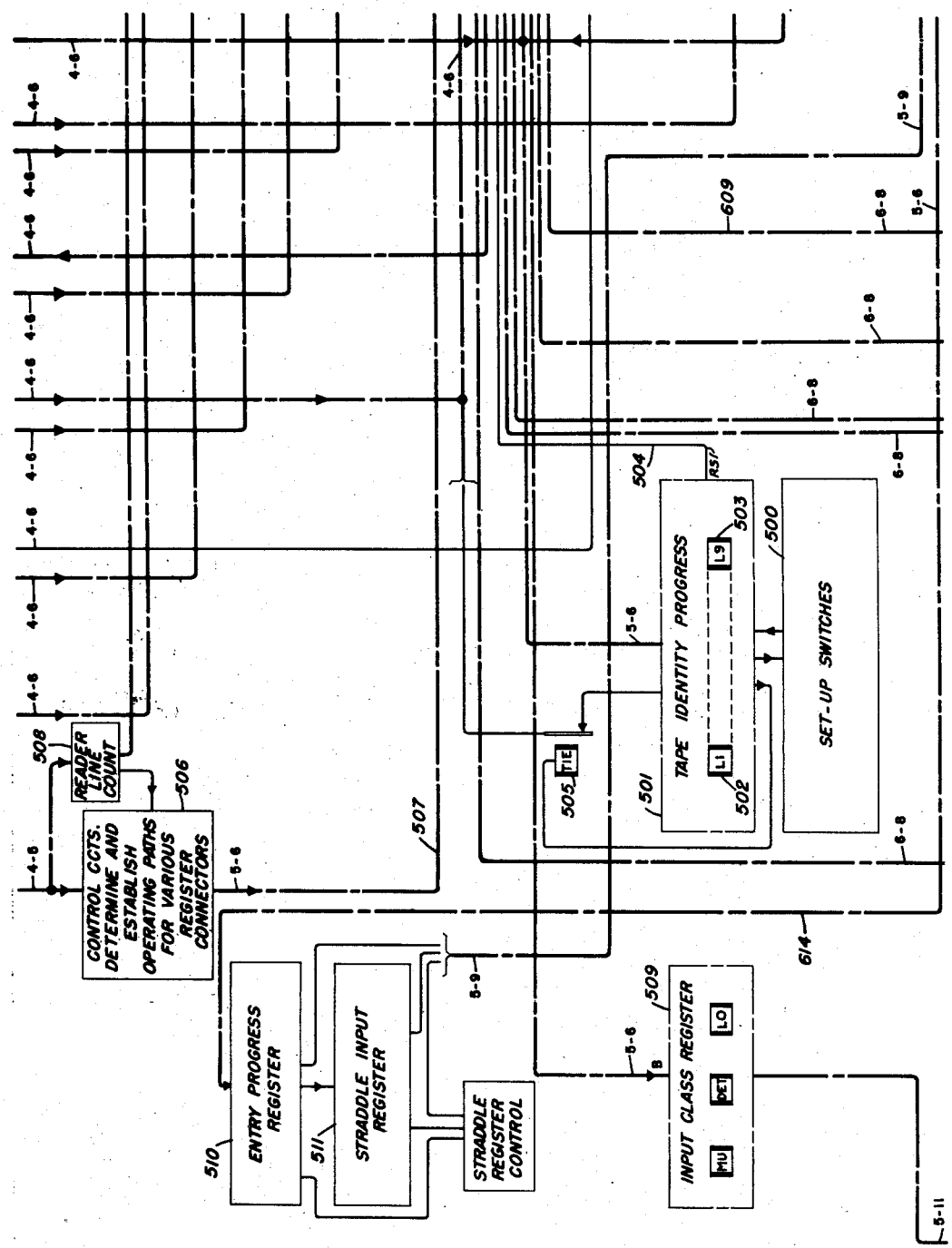

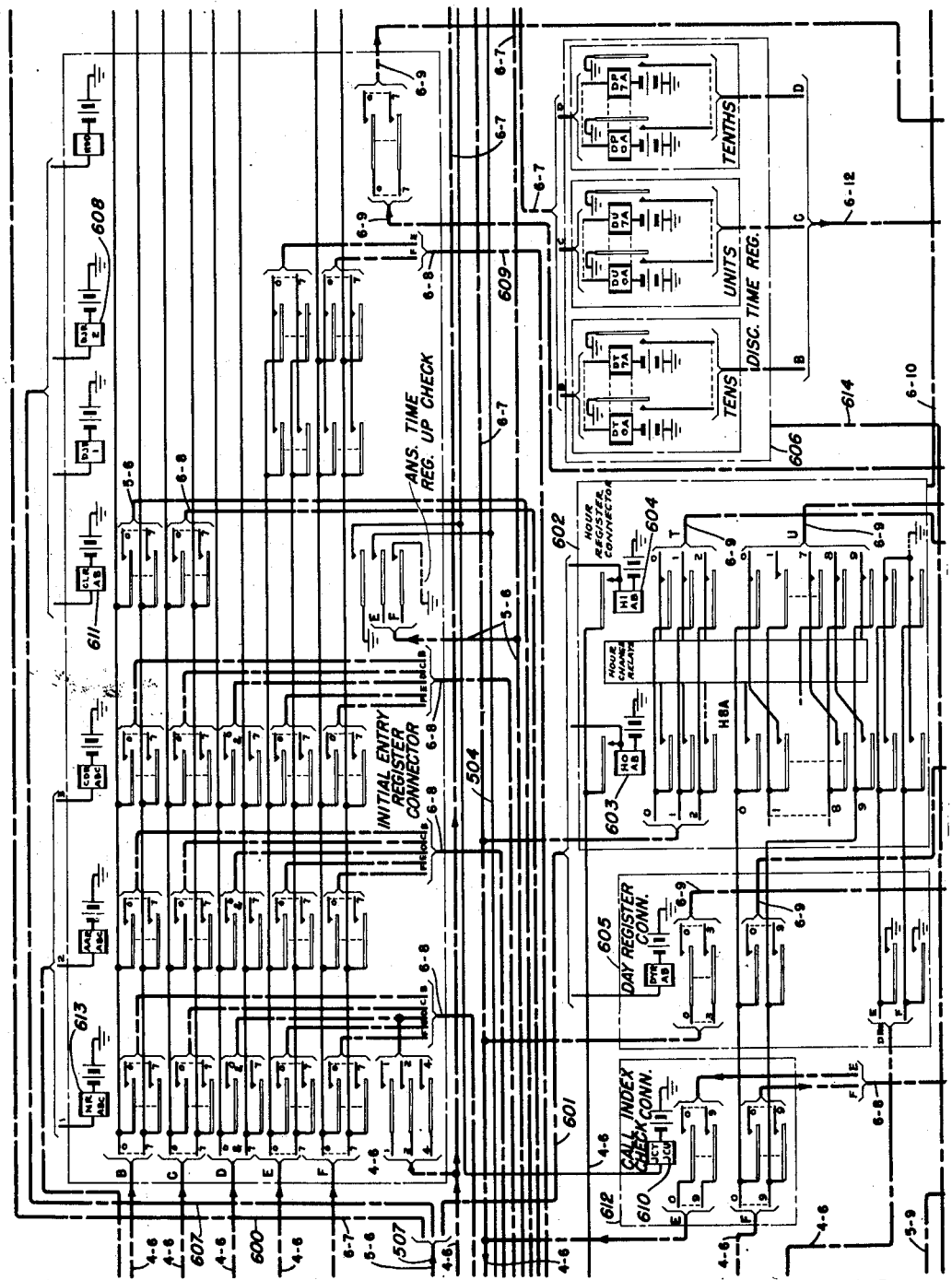

April 21, 1953 — E. W. FLINT — 2,635,807
AUTOMATIC ACCOUNTING DEVICE
Filed June 24, 1949 — 20 Sheets-Sheet 5

INVENTOR
E.W. FLINT
BY
ATTORNEY

INVENTOR
E.W. FLINT
BY
ATTORNEY

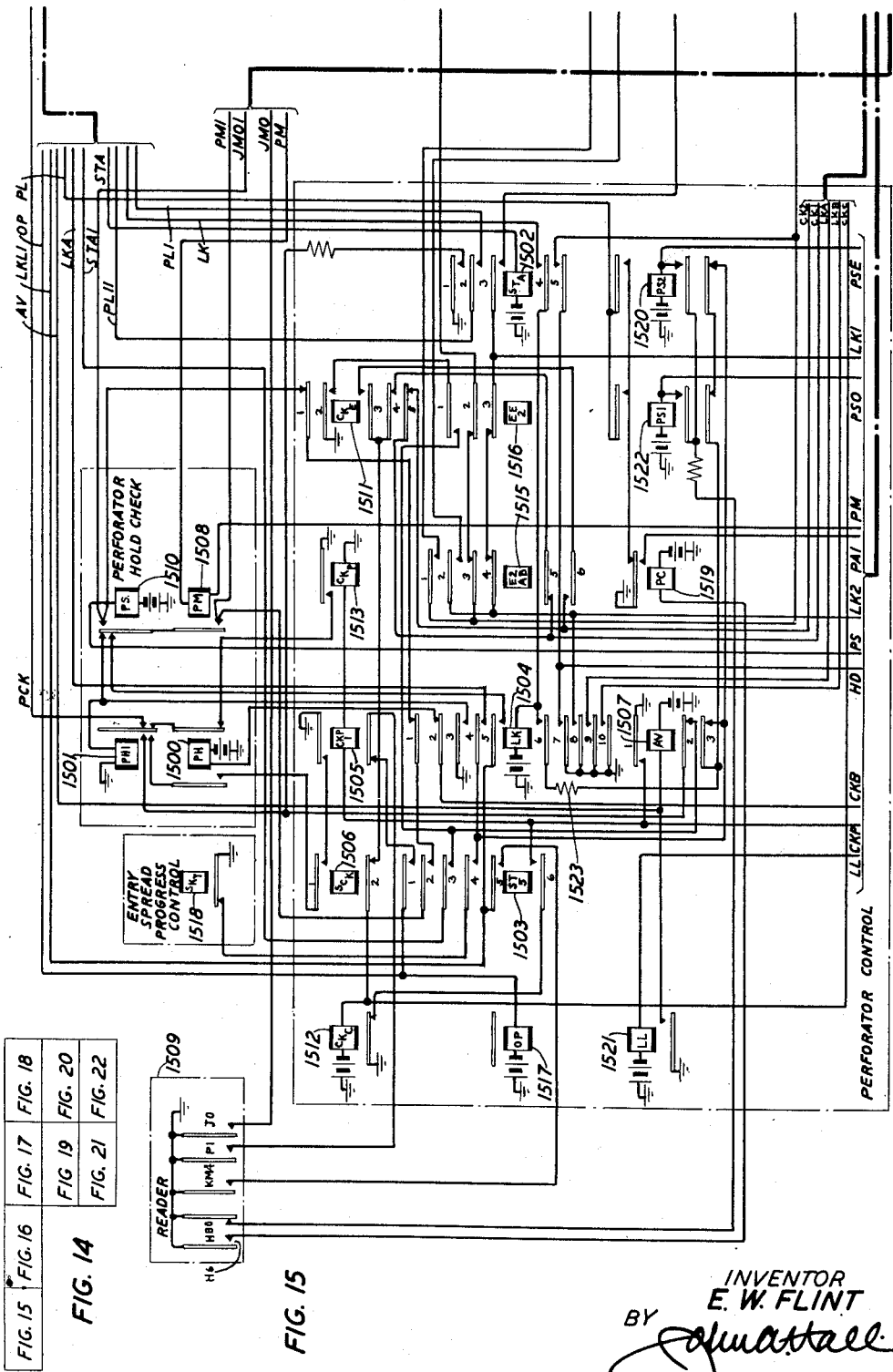

April 21, 1953

E. W. FLINT 2,635,807

AUTOMATIC ACCOUNTING DEVICE

Filed June 24, 1949

INVENTOR
E. W. FLINT
BY
ATTORNEY

April 21, 1953  E. W. FLINT  2,635,807
AUTOMATIC ACCOUNTING DEVICE
Filed June 24, 1949  20 Sheets-Sheet 17

INVENTOR
E. W. FLINT
BY John A. Hall
ATTORNEY

April 21, 1953 — E. W. FLINT — 2,635,807
AUTOMATIC ACCOUNTING DEVICE
Filed June 24, 1949 — 20 Sheets-Sheet 19

INVENTOR
E. W. FLINT
BY
ATTORNEY

Patented Apr. 21, 1953

2,635,807

UNITED STATES PATENT OFFICE 2,635,807

AUTOMATIC ACCOUNTING DEVICE

Erlon W. Flint, Mountain View, N. J., assignor to Bell Telephone Laboratories, Incorporated, New York, N. Y., a corporation of New York Application June 24, 1949, Serial No. 101,083

10 Claims. (Cl. 235—61.7)

This invention relates to automatic accounting systems and particularly to systems wherein records automatically produced by and of customer uses of given facilities over variable time periods are processed by electrical devices in a number of steps to produce customer bills for the services rendered.

The object of the invention is to provide means for collecting the data from various and scattered sources in the records, to calculate the charges to be made and to translate the records into the form required for printing.

The present invention resides in a plurality of circuit details of one of the electrical devices employed for one step in the automatic accounting process, that device known as the computer. This device, like the other devices employed, is arranged to take records from an incoming or old perforated tape, to modify the records in accordance with the purposes for which it is adapted and to produce a plurality of outgoing or new perforated tapes therefrom.

The original tape, automatically produced by customer use of given facilities contains scattered items of specific information, such as the initial entry, the answer or start time and the disconnect or termination time for each customer use and other items of general information, such as the general location of the using customer's facilities, the date, the hours and the identity of the billing period. This tape in a specific arrangement of an accounting system is employed as an incoming tape in a device known as an assembler, which collects or assemblies the various and scattered items of specific information.

The next step in the accounting process is performed in the computer which takes the assembled items of specific information, calculates therefrom elapsed time, modifies the result in accordance with a billing index which indicates the rate of charges, translates this result into a number of unit charges (message units in an automatic message accounting system) and distributes the calculated charges along with accompanying details to one or another of a plurality of outgoing tapes.

In a specific embodiment of the invention the computer is provided with a reader for entering data from an incoming tape into its calculator and registers and nineteen perforators for distributing the processed data to nineteen outgoing tapes. There will be ten of such perforators assigned to the recording of message unit charges. If the tape is from a marker group serving more than one office, then as many of these perforators as there are offices will be used so that a separate outgoing tape for each office will be prepared. If the marker group contains but a single office then the charges will be sorted on a decimal basis either in accordance with the thousands digit of the called line number or in accordance with the units digit thereof. There will be six of such perforators assigned to the recording of detail calls, that is calls, the details of which will be reported on the customers' bills. Since the central office tapes are recorded by "rounds" and since the longest round provided for will consist of six days, then six perforators are provided so that the detail calls may be sorted by days. There will be one perforator assigned to the recording of irregular calls such as straddle calls or those occasional calls which exceed the capacity of the device such as those extending over a period of time greater than ninety-nine minutes. There will be one perforator assigned to the recording of the details of message unit calls where these details are sought for monitoring or other purposes by the customer. The customer's bill will nevertheless be rendered on the message unit basis so that a particular message unit call will be processed by the computer and two records produced therefrom, one in short form on one of the regular message unit tapes for billing purposes and another in longer form on the message unit detail record tape for supervisory purposes. And lastly there will be one perforator assigned to record the line observed calls, that is, a record made of all calls originated on certain lines put under observation under routine or on account of customer complaints.

The first seventeen output tapes including the ten message unit tapes, the six detail call tapes and the irregular call tape will contain billing information whereas the last two, the message unit detail call and the line observer call tapes will contain reference information. The distribution of calls to these nineteen outgoing channels is a function of the computer and in most cases is controlled by some index in the initial entry of each call, but may in other cases be controlled by extraordinary conditions derived or detected by the computer itself, as when the elapsed time calculated exceeds two digits (99 minutes). Thus, the computer translates, calculates, computes, sorts and otherwise rearranges the items of information found on an incoming tape to form a plurality of outgoing tapes carrying the thus processed information in another form.

By way of illustration, a number of examples of assembled call information as they appear on the incoming tape and as they are transformed for perforation on one or another of the outgoing tapes are given with a short explanation of certain features of the transformation.

(1) A message unit call entered as:
```
135246
131746
213046
005444
```
which is a call made from office 0 of the given marker group (identified in the tape identity entries) from calling line 5444, and extending from 31.7 minutes to 35.2 minutes. The billing index (3), we will assume will cause the calculation of 3.5 minutes of elapsed time to indicate 2 message units, so that the computer will form and cause to be perforated on the number 5 perforator (thousands digit of calling line number, assuming a single office in the given marker group) the following output line:
```
125444
```

(2) A message unit call entered as:
```
135237
117537
214037
031234
```
which is a call from office 3 of the given marker group (identified in the tape identity entries) from calling line 1234 and extending from 17.5 minutes to 35.2 minutes. The billing index (4) we will assume will cause the calculation of 17.7 minutes of elapsed time to indicate 12 message units so that the computer will form and cause to be perforated on the number 3 perforator (sorted by office when the marker group contains more than one office) two output lines:
```
201234
000012
```

(3) A message unit call entered as:
```
101673
281021
156273
213073
005444
```
is one very similar to Example No. 1 except that it also includes an hour entry. The elapsed time is calculated as follows:
```
+01.6
+60.0
−56.2
─────
+ 5.4
```
If this in combination with the billing index indicates 3 message unit calls then the output will be:
```
135444
```

(4) A message unit call might appear as:
```
101652
281899
156252
213052
005444
```
The second line in this case is known as an irregular hour entry and while it does not show the actual hour it nevertheless sets the hour circuit back an hour so that the calculation is identical with Example No. 3 and the output line will be:
```
135444
```

(5) Should a call appear as follows:
```
101657
281021
281020
156257
213057
005444
```
then the calculation of elapsed time would be as follows:
```
+ 01.6
+120.0
− 56.2
─────
+ 65.4
```
Assuming that this elapsed time will indicate 27 message units, the output becomes:
```
235444
000027
```

(6) If the line 5444 of Example No. 1 were under observation, then the input to the computer would be as follows:
```
135246
131746
243046
005444
051133
010000
```
The entry index (the B digit of the first line of the initial entry) is 4 instead of 1 as in the first example, and two supplementary lines giving details of the called number are added. In this case the computer forms and causes to be perforated on the number 5 perforator, as before, the output line:
```
125444
```
This is billing information and will eventually be the data from which the customer's bill is made up.

In addition the computer forms and causes to be perforated on the line observation tape the following:
```
105444
062511
051133
010000
000402
```
This is supervisory information and is not used in forming bills but goes to company officials for various purposes such as routine checking, or for answering complaints, etc. The second line is formed by a translator from an assumed date (15th), hour (21) and answer time (31). The third and fourth lines are copies of the last two lines of the assembled call and the last line has a record of the message unit index (0), the chargeable time (04—rounded off from 3.5) and the number of message units charged (02).

(7) In Example No. 6 if the third line had been 233046 instead of 243046 then a message unit detail call is indicated. In such case the output line will be 125444 as before and the five-line detail information record will be exactly the same except that it will be perforated on the MUD tape instead of the LO tape and will eventually go to the customer for his information.

(8) A detail call read from the incoming tape as:
```
135213
131713
239013
005444
051133
010000
```
will be processed and distributed to the detail call output tape as:
```
105444
062511
051133
010000
000400
```
The first line of this output gives the calling line number. The second line is the start time line which is synthesized from the day (15), the hour (21) and minutes (31). The third and fourth lines are copies of the last two lines of the call as entered and the last line shows the chargeable time as 04 minutes. Note the difference between this and Example No. 6 where the number of message units (02) appeared as the last two digits of the last line. In the present case the message billing index (9) in the third line 239013 of the entries read from the incoming tape is a means which causes the last two digits of the last line of the processed call perforated on the detail call tape to be blanked out as 00.

(9) With a very slight difference, the digit 4 instead of the digit 3 as the B (or second) digit of the first line of the initial entry as:

135213
131713
249013
005444
051133
010000 the following record:

105444
062511
051133
010000
000400 will be perforated in both the line observing output tape and the detail call tape.

There are many variations of the above described patterns to take care of many operating contingencies and which need not be described in detail. One of the important circuits of the computer but which in fact gets less use than others is the so-called straddle circuit for taking care of a variety of irregular calls and which are mainly recorded so that an operator or clerk may investigate the irregular circumstances and prepare a bill by hand.

In general, the computer consists of a plurality of registers into which both items of specific information and items of general information may be entered, a calculator, steering means, line forming pattern means and distributing means. Specific details of a call are entered, the elapsed time is calculated and this is weighted, rounded off and converted into charges, either chargeable time or a number of message units.

Again, generally the first items of information entered in the computer are the recorder number, the hour and the day and these are registered before any specific problem is presented for calculation and remain registered until a complete group (for a single call identity index) of calls has been processed. During the processing of this group the hour and the day registrations are changed from time to time by the occurrence of an hour entry found among the scattered items of specific information.

The first of the specific items of information to be registered are the two items fixing the start and end of the customer use of the facilities and from these the calculator derives the elapsed time and transmits this to an elapsed time register where it is held under control of an output control circuit. Generally, the elapsed time may be calculated and registered before the initial entry giving other details of the customer use can be completely registered and the output lines formed and transmitted. To save time, an overlapping arrangement is employed, whereby after a calculation has been made and the elapsed time has been transferred to the elapsed time register but before the computer has transmitted the patterned lines to an output tape, the time element lines of the next call are entered in the calculator.

After the complete information has been registered in the computer the output control will cause the selection of a particular output channel and will transmit thereto the patterned lines such as those explained hereinabove.

The circuits are complex and are characterized by a great many check circuits for insuring accuracy. It is believed that the operation of this processing device can best be seen through a short description of certain of the novel features incorporated therein, as follows:

One of the objects of the invention is to occasionally test a holding or guard circuit to ascertain that it is in proper working condition in order to guard against improper operation of the network. Where the failure of the guard circuit would simulate normal operation of the device as a whole, such guard circuit must be tested occasionally to see that it is performing its function.

The invention consists of a circuit network for controlling the operation of a plurality of perforators in a tape processing device useful, for example, in an automatic message accounting system. Such a system in general consists of a number of devices each of which uses for incoming information a long perforated tape which has been produced by some other device and which thereupon performs certain accounting operations with the information thus supplied and prepares a plurality of new tapes with processed, computed or rearranged information. The device thus consists essentially of a reader to read off items of information from an incoming tape and a plurality of perforators for perforating in a like plurality of outgoing tapes the said processed, computed or rearranged items of information.

In accordance with conventional methods, practically every operation of the device is subject to an up check or a down check and where such a check fails, the operation of the device is halted and an alarm is sounded. Thus, when a perforator is operated, its operation consists of the energization of a selected number of punch magnets and a perforator advance magnet. The punch magnets and the advance magnet are operated simultaneously and upon the release of the advance magnet and when the punches operated by the punch magnets have been withdrawn and are out of contact with the tape, the tape is advanced. Check relays equal in number to and operating with the punch magnets control an up-check circuit which proves that a sufficient number and only a sufficient number of punch magnets in a proper pattern have been operated. This up-check circuit also proves that one and one only perforator is connected in circuit. If this check circuit is thus closed, it will advance the operation of the device as a whole but if it is not closed then an alarm will be brought in. As there is an auxiliary relay for each punch magnet, so there is an auxiliary relay for the perforator advance magnet and this auxiliary relay upon operation will lock both itself and the perforator advance magnet in a guard circuit which depends upon the proper operation of the said check circuit. When the check circuit has discharged its proper function, then the locking circuit for the perforator advance magnet and its auxiliary relay will be transferred to a circuit which will allow the release of this perforator advance magnet and its auxiliary relay in proper time and order. In this way the perforator advance magnet may be held operated to prevent the advance of the tape even though the punch magnets may be released.

Since the locking circuit of this perforator advance magnet and its auxiliary relay are transferred to the circuit which caused the original operation thereof, it follows that if this locking circuit fails, then the normal operation of the device will not be hindered but the tape might be advanced at the wrong time, that is, it might be advanced even though the code perforated does not prove to be valid and for that reason should be held rather than issued as a customer charge. Hence, it is important that the locking (or guard) circuit be examined from time to time to see that it is in working order, for it is the duty of this guard circuit to prevent the issuance of erroneous information.

Means are, therefore, provided for frequently making a routine test of the circuit employed for holding or guarding the magnet of the selected perforator which causes the paper tape of that perforator to be advanced. The perforator is arranged to be operated after the data for a customer charge has been entered in the computer and the charge has been computed and the operation of the perforator overlaps the entering of the data for the next charge so that there is time to spare in the perforator operation. Therefore, an extra operation occupying a whole reading interval is used after a customer charge has been fully perforated on an output tape to make this routine test.

The circuit for the operation and holding of the perforator advance magnet is a long one, extending over a large number of wires each extending from one relay spring to another, an incoming conductor being joined to an outgoing conductor by a soldered connection at each such spring. The circuit in effect is a conductor multipled to a large number of points (each of said relay springs) but in practical construction it consists of a series circuit having two wires joined together and soldered to another circuit element at each of such multiple points. Experience proves that such a circuit may be tested for continuity through every such soldered connection by including all these sections of wire in a series circuit and hence after each group of output lines constituting a customer charge has been perforated, the circuit for the next operation is prepared by a routine test including the whole of this soldered connection circuit in a series arrangement with a relay having a load characteristic similar to the load characteristic of a perforator advance magnet which will use only a part of the circuit, the test being that if the whole of the circuit is capable of operating the substitute relay a part of it will certainly be capable of operating a magnet.

The means for making this routine test consists of (1st) a relay (PH) having the characteristics of an advance magnet for operating only when the circuit, part of which will be used to operate and advance magnet is proved to be wholly intact, (2nd) a relay (PH1) placed in series with this first relay and which will substitute for the operating connection for the first and, therefore, hold this first relay operated, (3rd) a start relay (STA) for readying or enabling the perforator start circuit and (4th) a lock relay (LK) operated only when the start relay has been operated to provide the normal locking paths for the perforator advance magnets. This last relay will then itself lock up and hold the perforator circuit until a perforator operation for a customer charge has been completed and as it operates it dismisses these routine testing relays and they must then return to normal and remain in that condition until the following perforator operations for a customer charge have been completed, even though this entails the use of two perforators.

A feature of the invention may, therefore, be stated as a means for using a dummy relay having the same load characteristics of a relay later to be operated over a given circuit to test the said given circuit and only when this said dummy relay responds as a regular relay should, to enable the said circuit to operate the said regular relay.

A feature of the invention may also be stated as a means for making a trial operation of a circuit about to be used combined with means responsive only to the success of the said trial for starting the operation of the said circuit.

A feature of the invention is the use of duplicate circuits for the prevention of erroneous operation. In an accounting system it is important that a failure or an unstandard condition should not only be reported but that it should not be allowed to produce a secondary and erroneous operation. Not only are check circuits used to determine that a circuit is ready for operation and after it has operated to determine that its operation has been according to plan, but now means are used to produce a given result and in addition to prevent the producing of any other result. Therefore, two identical circuits are employed, each controlled at various points by the same relays and each terminating in an independent relay which exercises like control over other circuits. Thus, each of the said independent relays may have a front contact in one controlled circuit and a back contact in another controlled circuit. If only one such relay were provided and it should fail to operate due to some fault in its operating circuit then the circuit through its back contact would erroneously be maintained closed and this might lead to some erroneous operation. However, if duplicate circuits are employed and one of the relays should fail so that only one of the two operates, then both the circuit depending on the front contacts thereof and the circuit depending on the back contacts thereof would be opened so that no unauthorized operation could take place. The laws of statistics show that the likelihood of the two duplicate circuits failing simultaneously from like faults is so rare that it may be dismissed from a practical standpoint.

A feature of the invention may then be stated as a means responsive to a failure in an attempt to establish a given condition for preventing the establishment of a secondary condition which might otherwise be derived from such failure. Stated otherwise, means are provided for preventing a secondary circuit operation in case of a primary circuit failure comprising duplicate primary circuits each terminating in a relay, a secondary circuit having two branches one closed in series through front contacts of said relays and another closed in series through back contacts of said relays whereby a failure in either of said primary circuits will open both of said secondary circuits.

As an example of the use of such a means, the checking circuit for controlling the output perforators may be cited. Here it must be certain that a proper output line is formed, that one and one only output perforator is ready to receive it and that in one case entries are to be put on two tapes (in sequence) as in a line observing case where the charging information is delivered to one output tape and the supervisory information is delivered to the line observation tape (as in Example 9 above). In this case, two relays (2TA and 2TB, two tapes, used when entry is to appear on two tapes) are each operated over independent but duplicate circuits so that the check relay whose circuit is closed through a long string of other relays concerned in the operation, still cannot be operated unless both these relays are in the same relative state. If either fails due to some unstandard condition then the series circuit through the front contacts as well as the series circuit through the back contacts will be opened and the check relay will fail to operate and this will eventually result in an alarm.

A feature of this invention is means in a computer for gathering required information for the forming of specific output lines. In a copending application Serial No. 101,089, filed June 24, 1949, by A. E. Hague, now Patent No. 2,615,628 issued October 28, 1952, certain pattern relays and output classification means are described. Hague provides the means for controlling the form of the output and the present invention provides the means for supplying the required information for each output line as it is called for. The computer provides a plurality of sources of information in the form of registers some of which are filled directly from information read from an incoming tape and others of which are filled with information derived by computation and otherwise from items of information read from an incoming tape. Some of the incoming information comes by way of items of specific information and some by way of items of general information. All the information, however, that will be required for forming the lines of the output is registered in the various registers of the computer or is set on the tape identity switches and is available when required.

When an entry forming relay is operated in accordance with a determined output classification then a number of line forming relays are selected and are operated in sequence under control of a line counting means and each in turn relays information gathered from given sources to a perforator for the purpose of recording such formed line.

A feature of the invention may then be stated as a plurality of line forming relays, each arranged to gather information from a specific source and to operate in sequence under control of a line counting means to supply output information derived by the computer.

Another feature of the invention is a means for speeding up certain operations. Where time is valuable it has been found that an advantage can be gained by making a certain operation depend on the opening of pair of operated contacts rather than on the opening of a pair of normally closed contacts. In other words, a relay will release faster than it will operate. Therefore, a pair of normally closed contacts in a given circuit is bridged by a pair of operated contacts and the normally closed contacts are then opened well in advance of the time they should be opened in conventional operation so that the circuit becomes "cocked" and is ready to function rapidly when the operated contacts are released. The difference in time between this and conventional operation is small but is important. A feature of the invention may then be stated as an arrangement for cocking a closed circuit to prepare it for rapid operation.

This feature may also be used as a selective means, for where a plurality of circuits, such as the holding circuits for a plurality of registers, are to have a given number thereof released simultaneously, this given number may be cocked so that only those so prepared will be released, even though a general release operation may be carried out.

This feature consists of the combination of (1) a relay for maintaining a register locked, (2) a general release relay common to a plurality of relays which signals to all registers simultaneously the exact time for release, (3) a cocking relay which maintains a locking path for said locking relay so that it cannot respond to the signal from said release relay and (4) a means for operating the said cocking relay at a time that the said locking relay is operated whereby the release of the said release relay will be immediately followed by the release of the said locking relay.

Other features will appear hereinafter.

The drawings consist of twenty sheets having twenty-three figures as follows:

Fig. 2 is a highly schematic showing of the basic switching circuit employed herein;

Fig. 3 is a block diagram showing how Figs. 4 to 13, inclusive, may be placed to form a more detailed but yet a schematic-like use of the elements of the present invention and in which:

Fig. 4 shows the reader and the reading relays by which the input tape is scanned;

Figure 7:
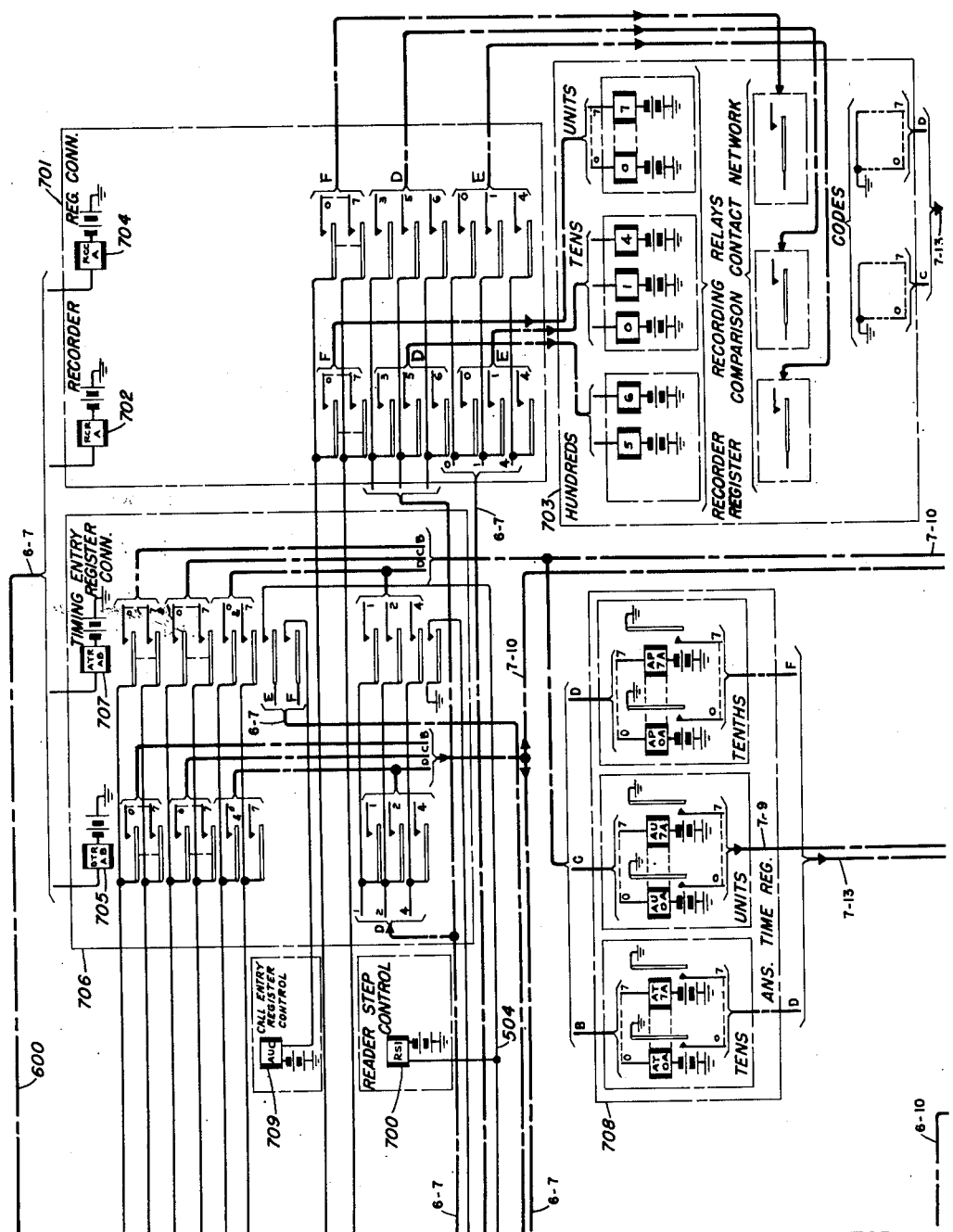
Figure 8:
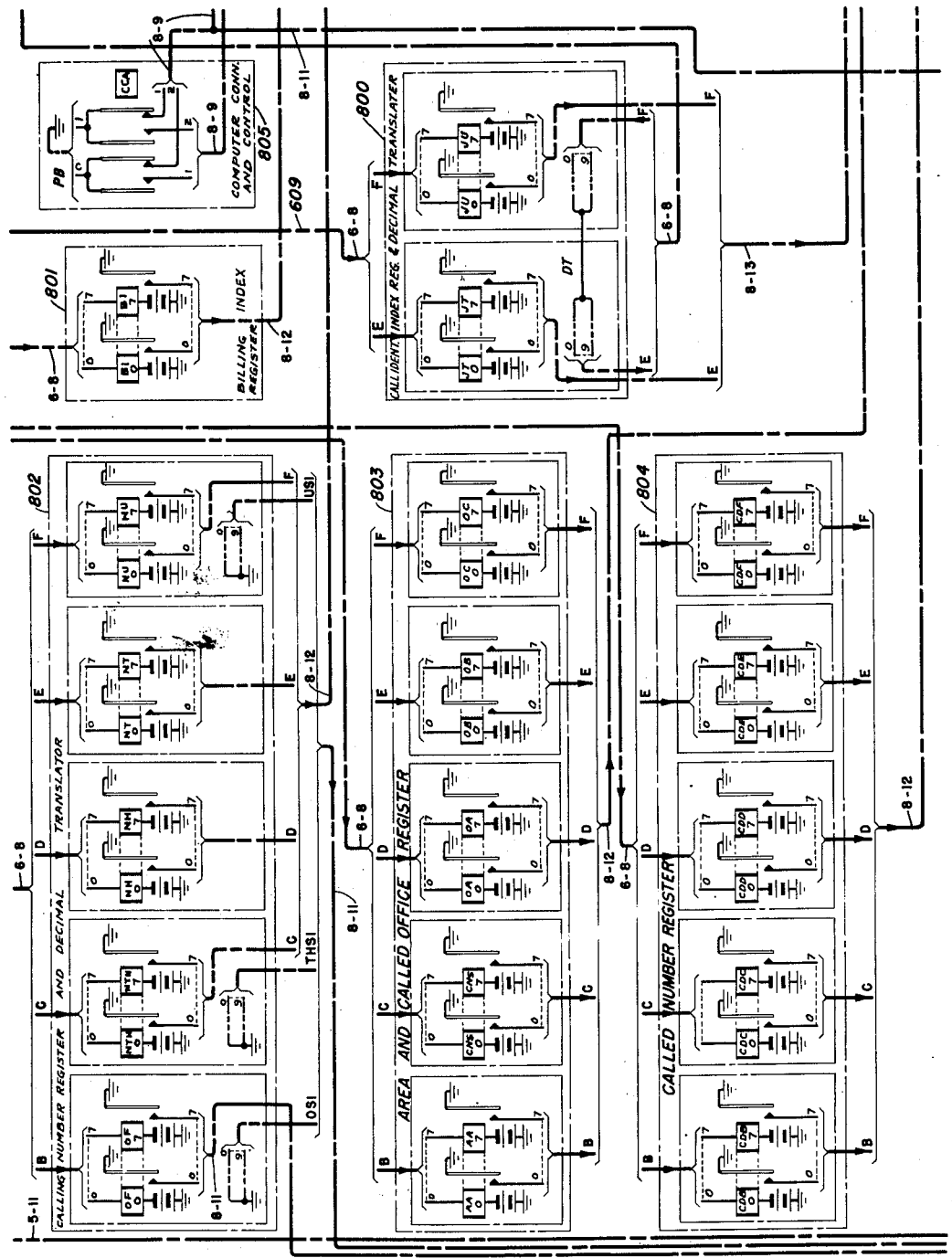
Figure 9:
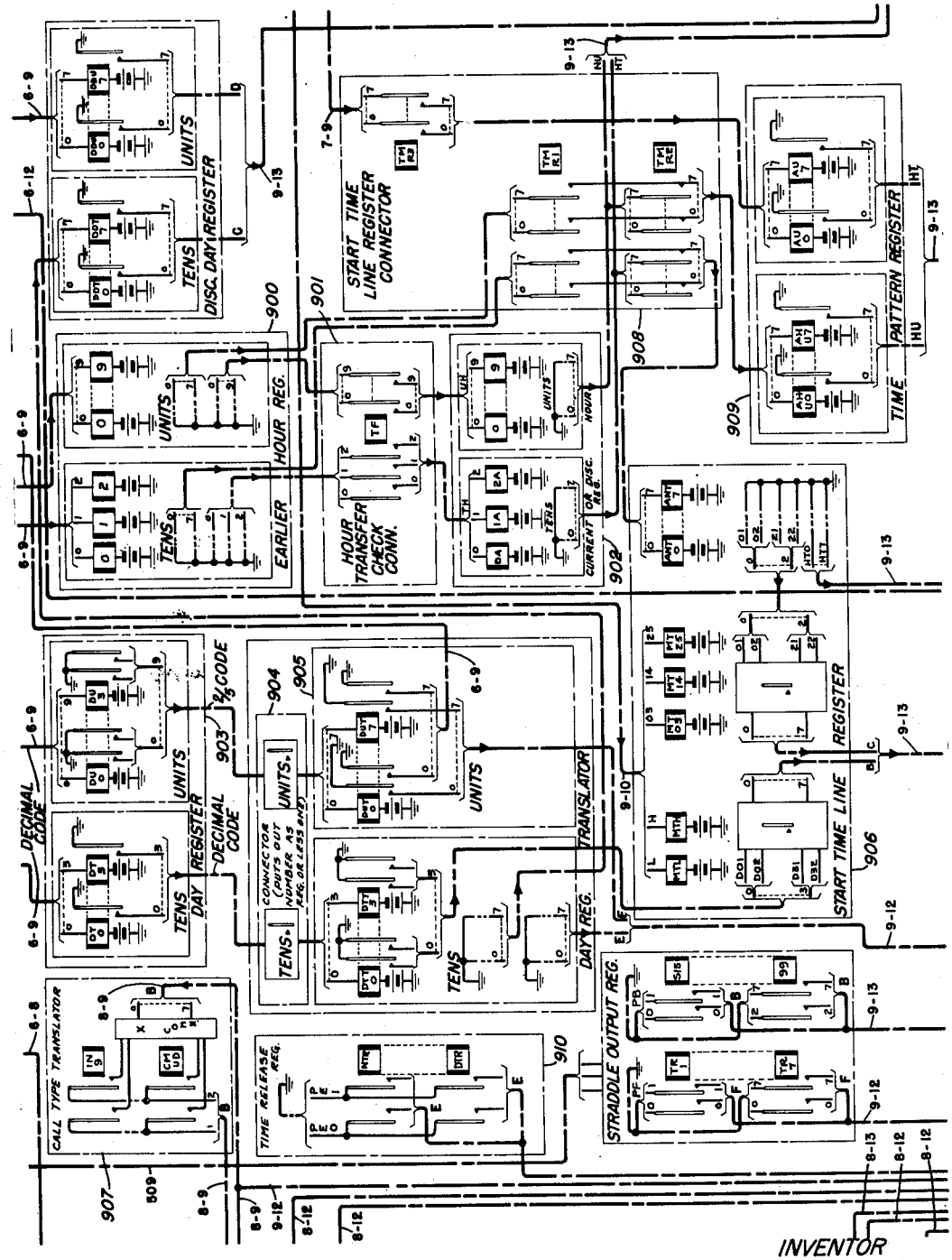
Figure 10:
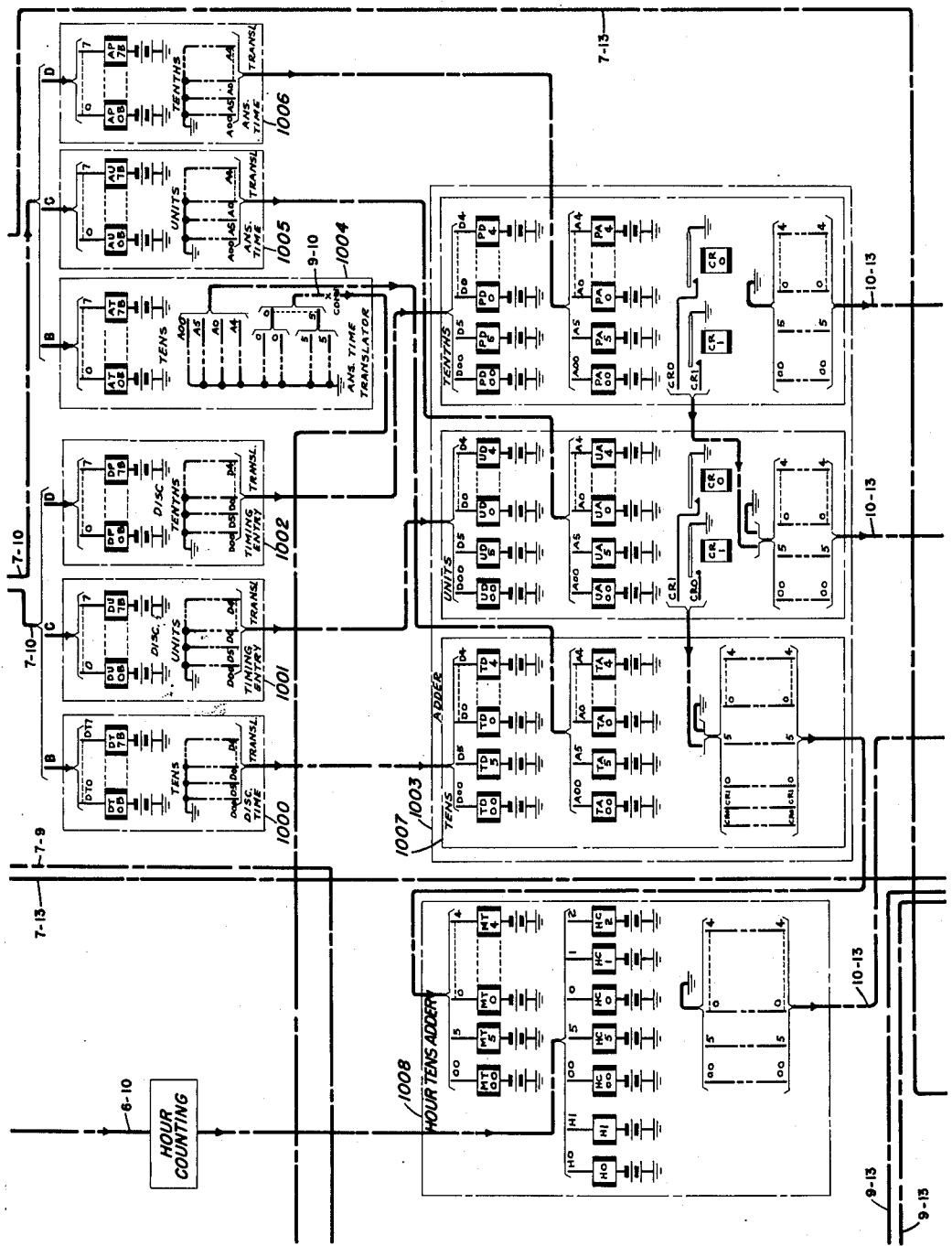
Figure 11:
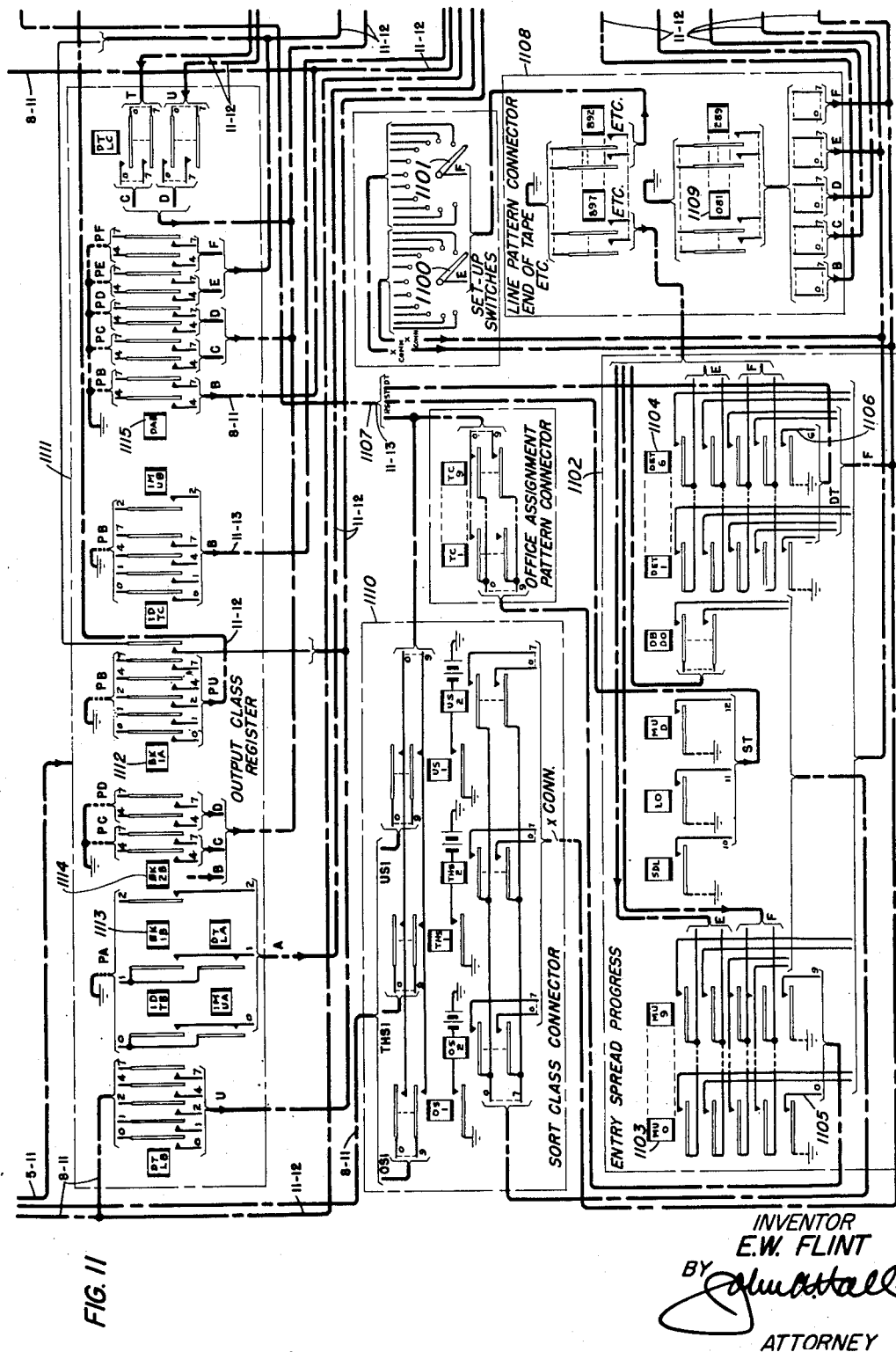
Figure 12:
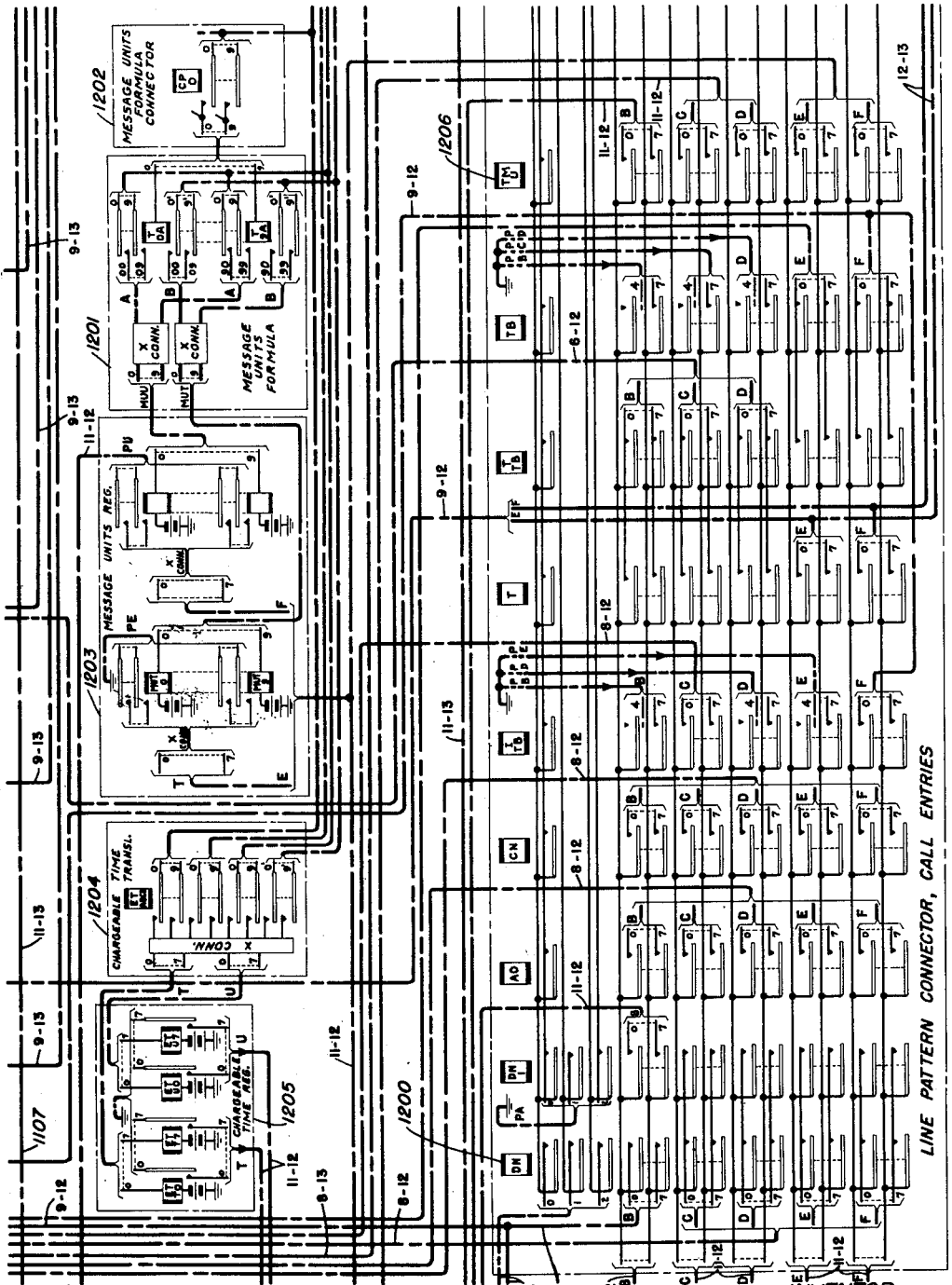
Figure 13:
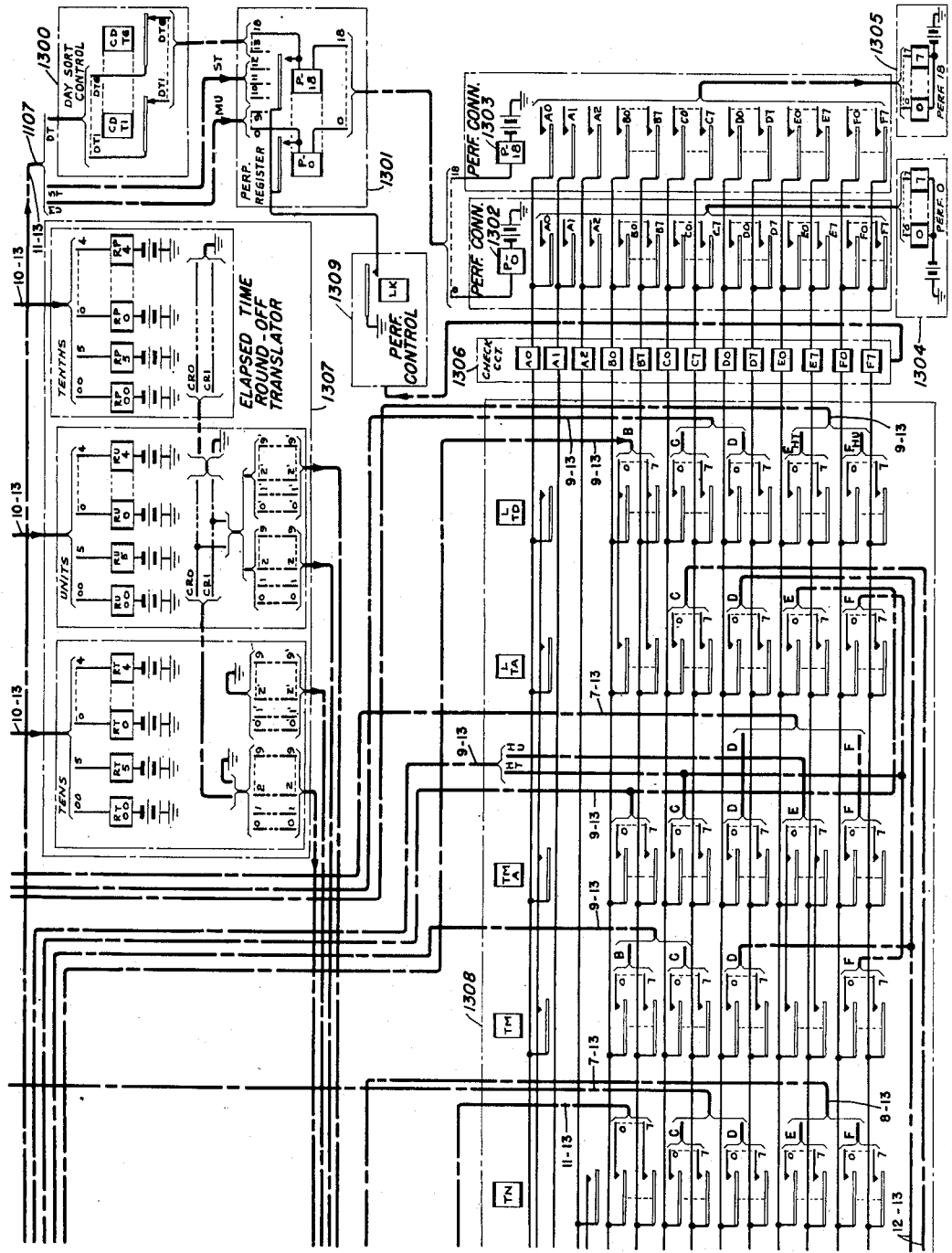
Figure 16:
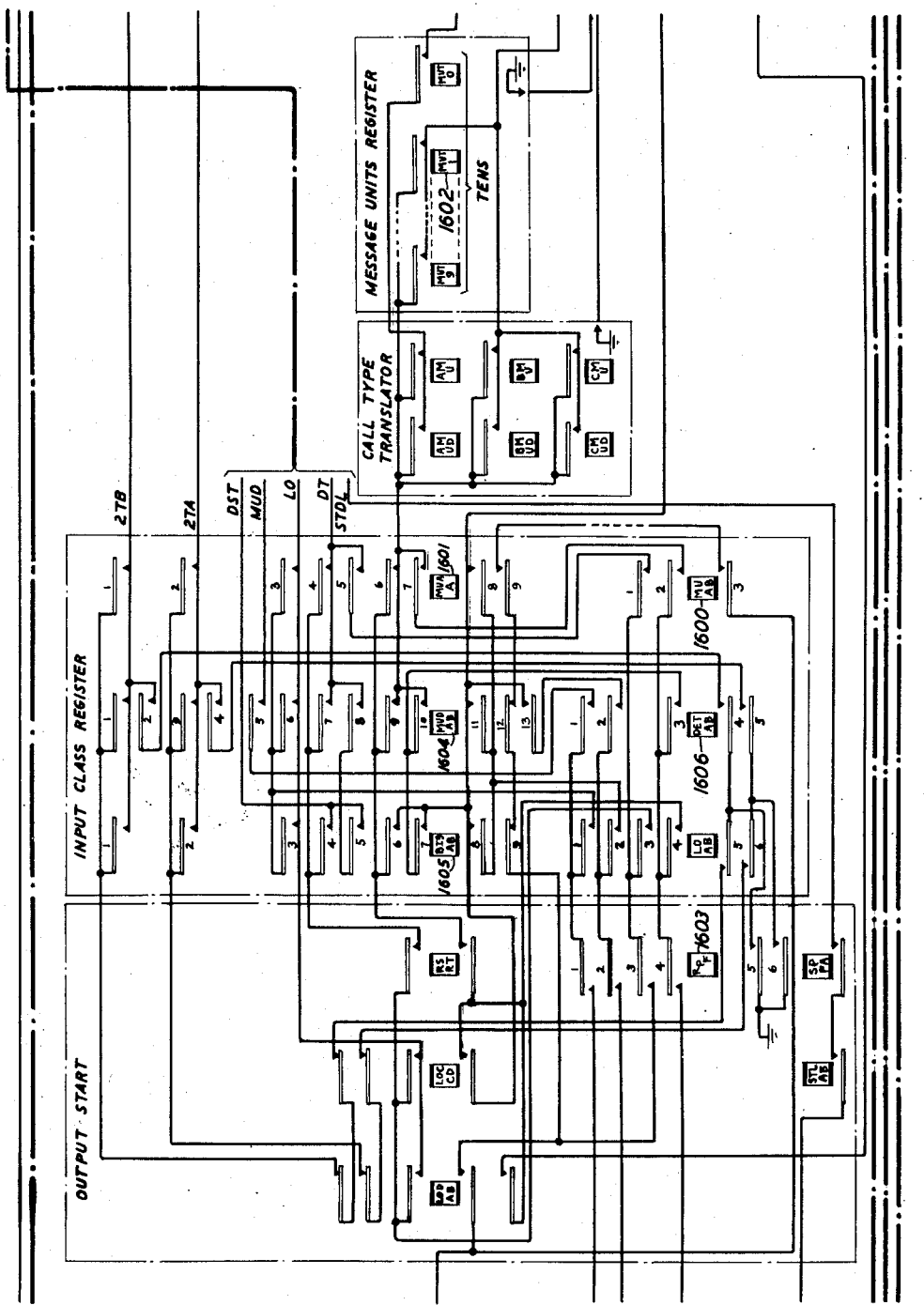
Figure 17:
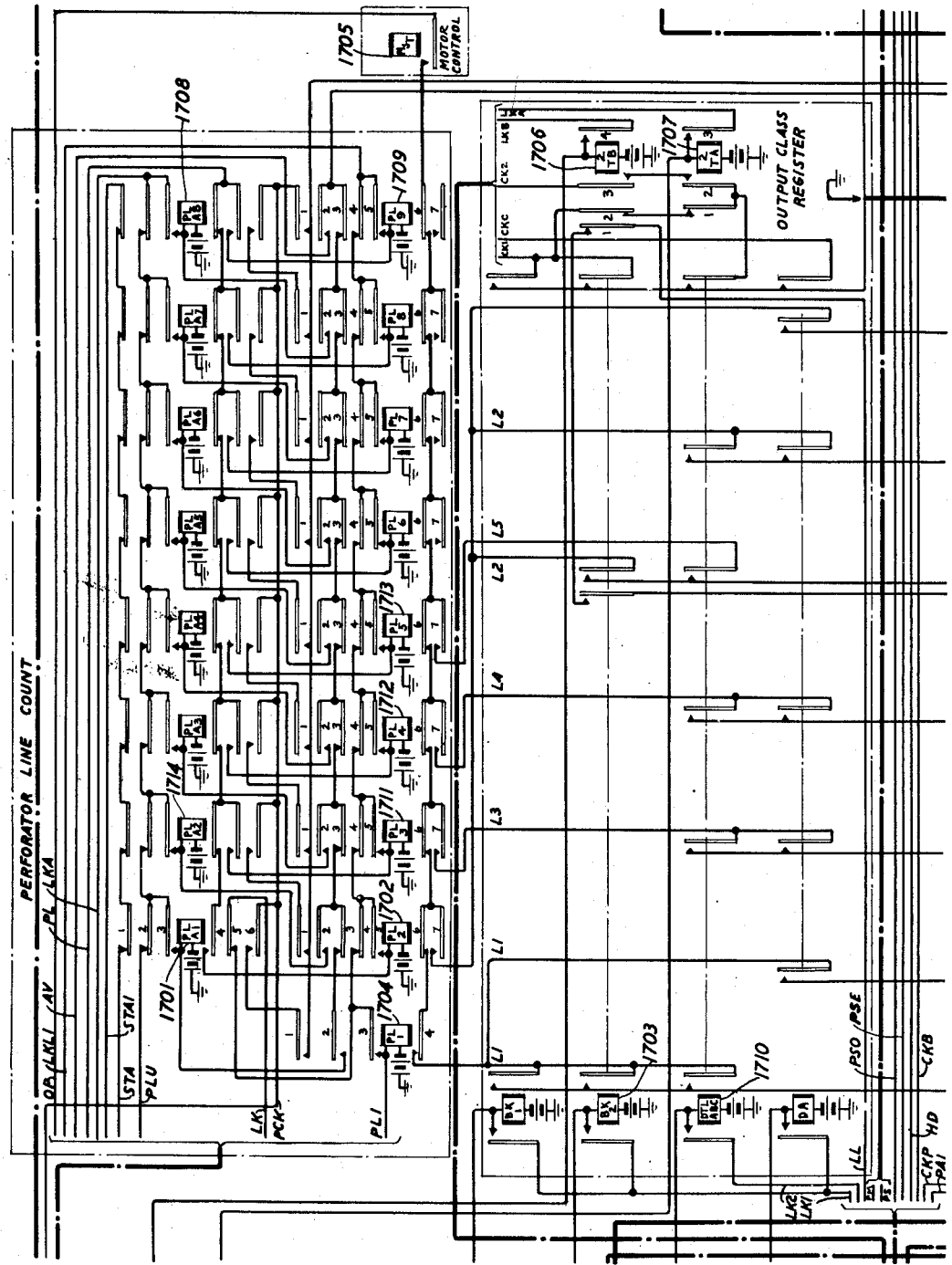
Figure 18:
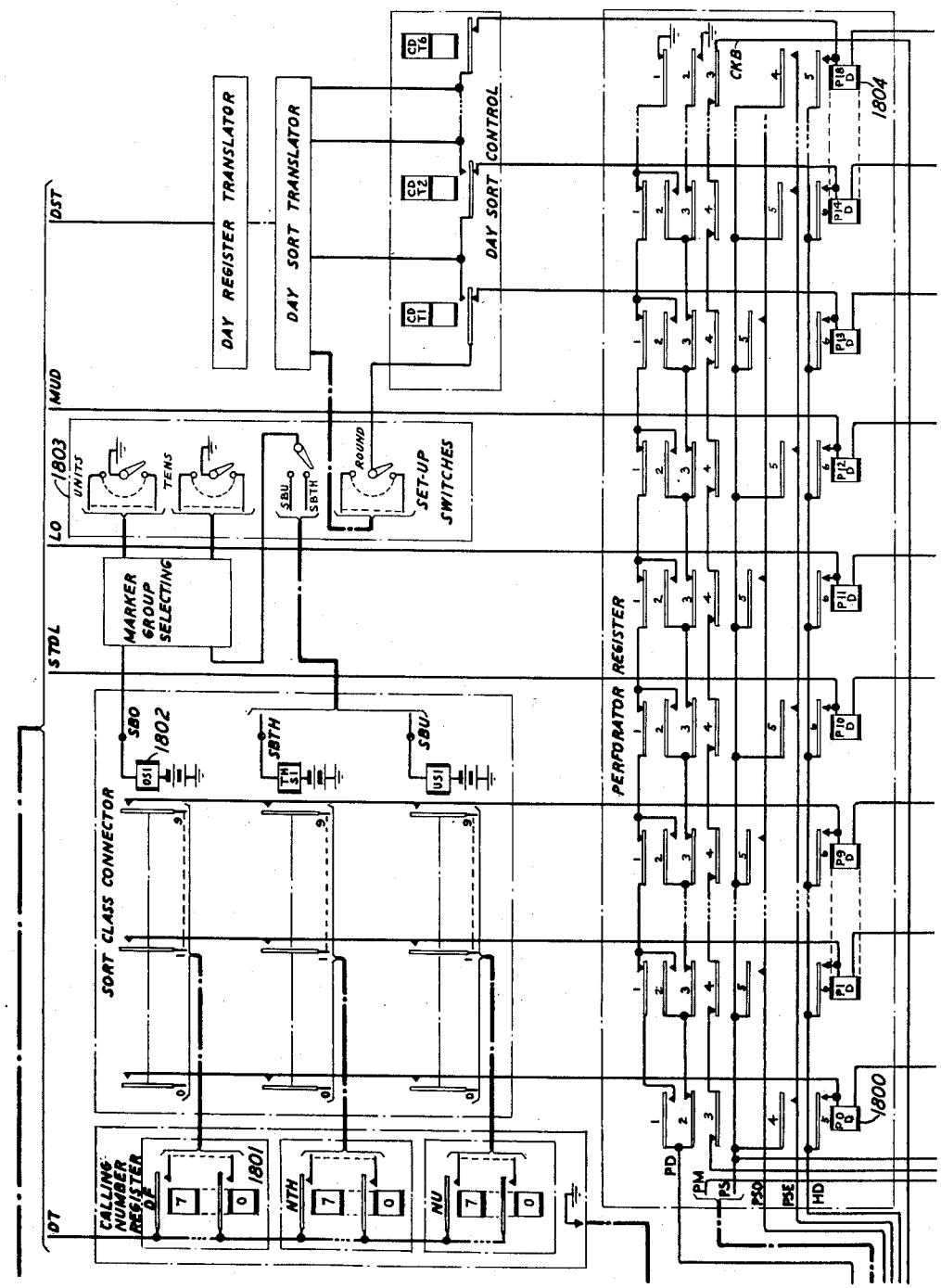
Figure 19:
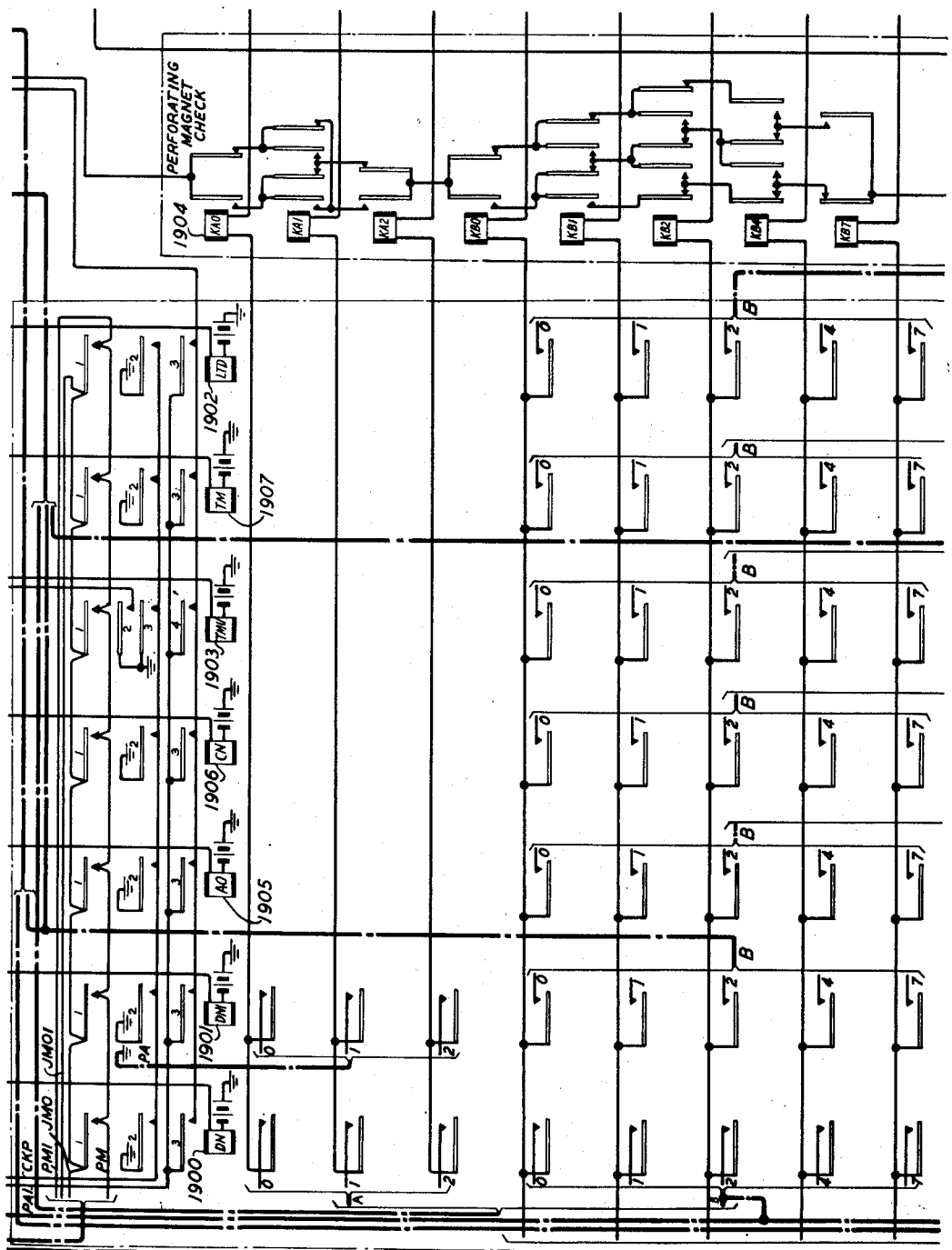
Figure 20:
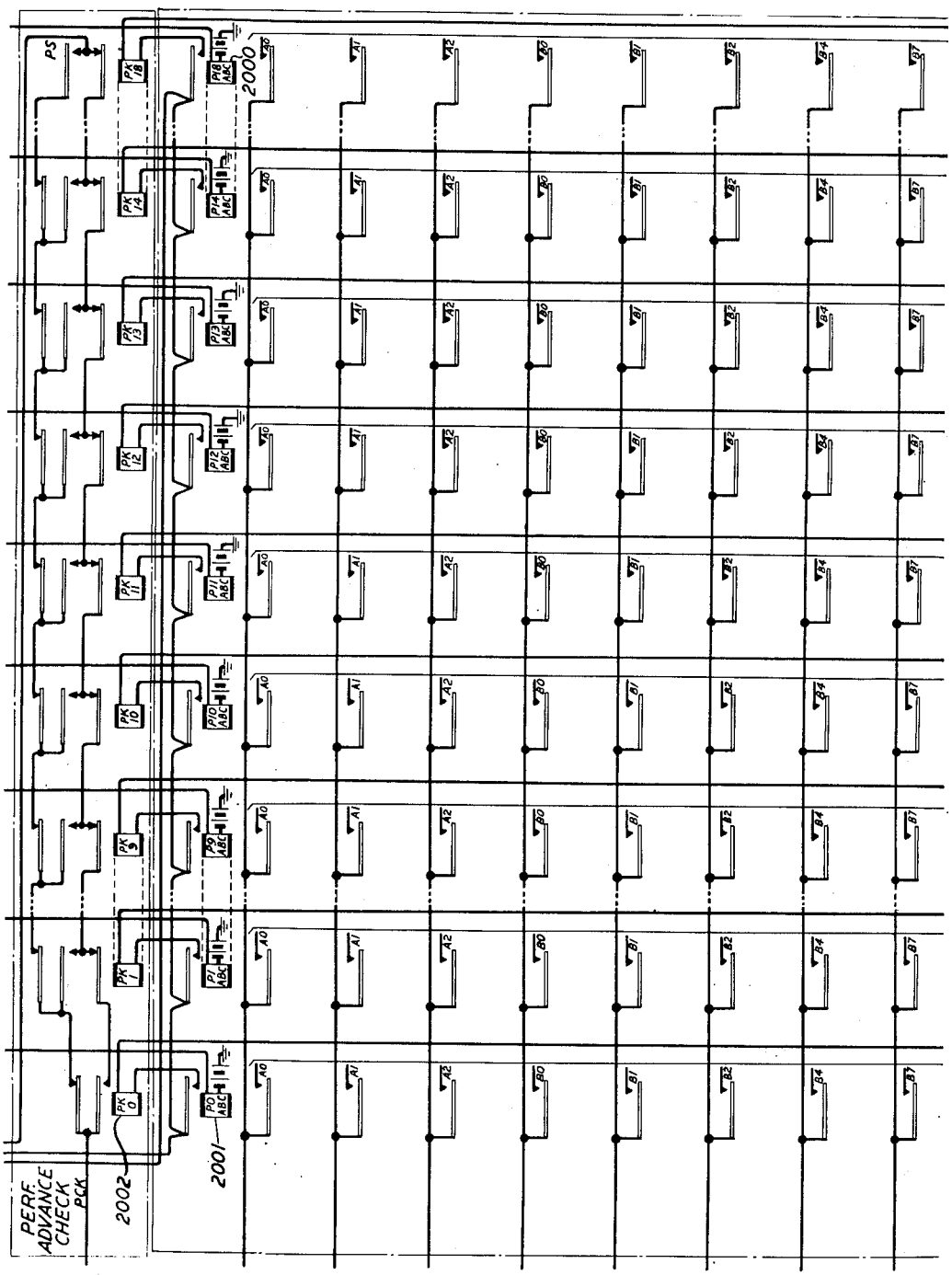
Figure 21:
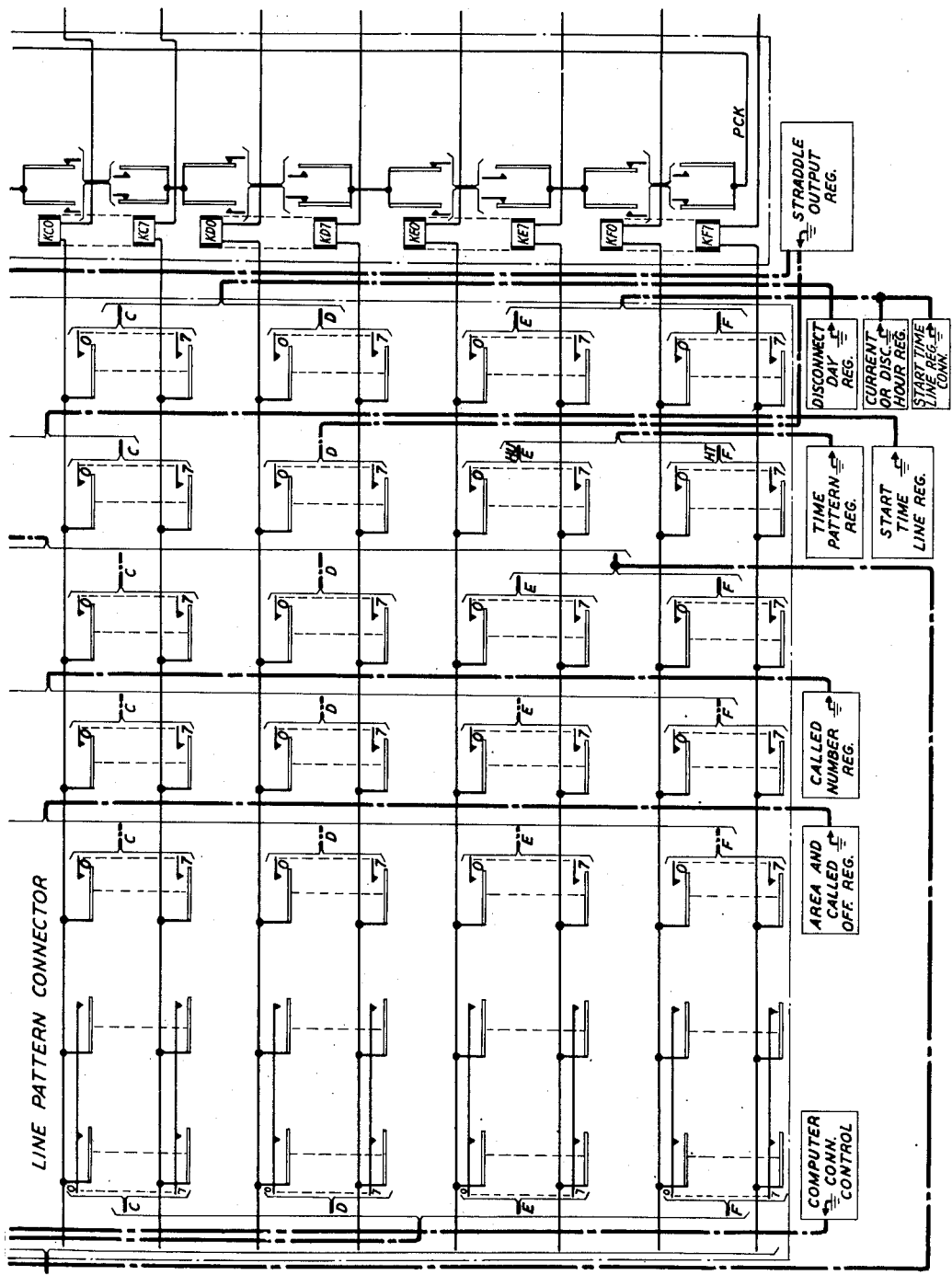
Figure 22:
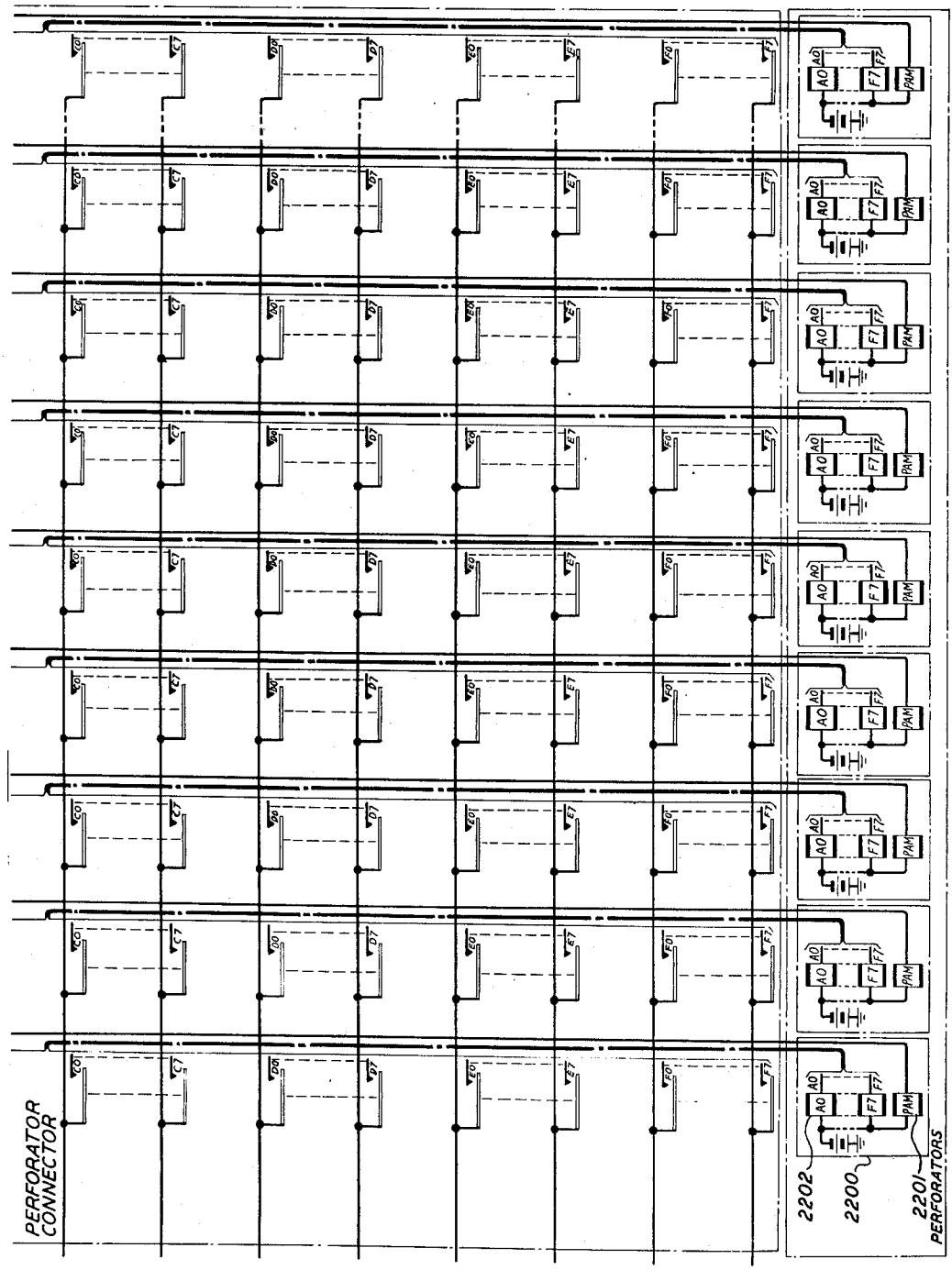
Figure 23:
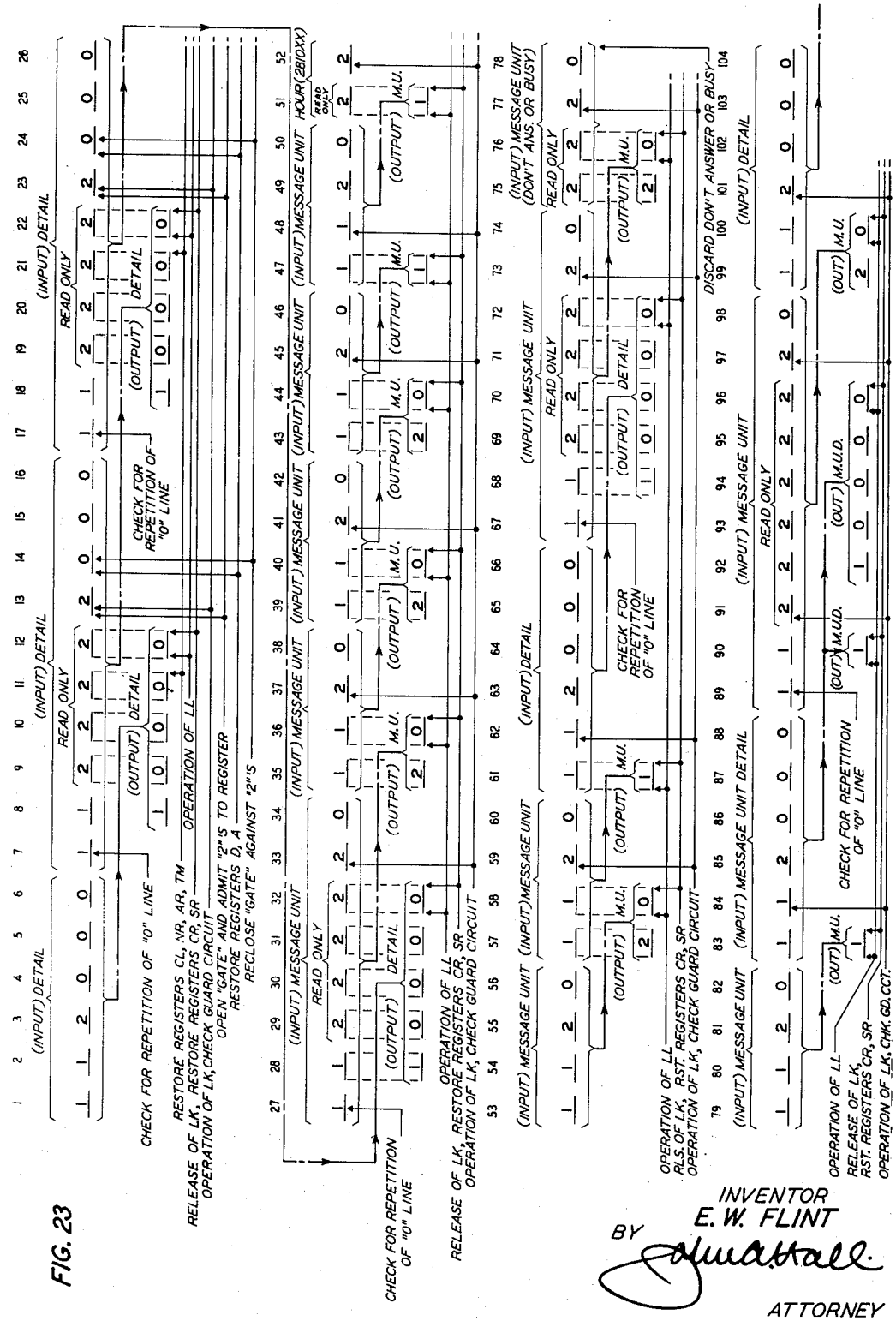

Fig. 5 indicates the location in the circuit arrangement of the reader line count means, the reading relay translator and the control circuits;

Fig. 6 shows a number of register connectors and indicates the disconnect time register;

Fig. 7 likewise shows a number of register connectors and indicates the answer time and the recorder register;

Fig. 8 shows the calling number register, the area and called office register, the called number register, the billing index register and the day and junctor register and decimal translator;

Fig. 9 shows the call type translator, the day register, the time release register, the day register translator, the straddle output register, the start time line register, the earlier hour register, the hour transfer check connector, the disconnect register, the disconnect day register, the start time line register connector and the time pattern register;

Fig. 10 shows the adder, that part of the computer which performs the mathematical functions thereof;

Fig. 11 shows the output class register, the sort class connector, the entry spread progress circuit, the office assignment pattern connector, the set-up switches and the line pattern connector for the end of tape perforation;

Fig. 12 shows the chargeable time register, the chargeable time translator, the message units register, the message units formula device, the message units formula connector and the line pattern connector for call entries; and Fig. 13 shows the elapsed time translator, the day sort control, the perforator register, the perforator control, part of the line pattern connector for call entries, the check circuit therefor and indicates two of a plurality of perforator connectors and the associated perforators;

Fig. 14 is a block diagram showing how Figs. 15 to 22, inclusive, may be placed to form a schematic circuit diagram illustrating the characteristic novel features of the invention;

Fig. 15 shows essential circuit elements of the reader, the entry spread progress control, the perforator hold check circuit and the perforator control circuit;

Fig. 16 shows the output start circuit, the input class register, the call type translator and the message unit register;

Fig. 17 shows the perforator line count circuit elements of the motor control circuit and the output class register circuit;

Fig. 18 shows the sort class connector, the calling number register, the marker group selecting circuit, the day register translator, the day sort translator, the day sort control circuit, the set-up switches and the message unit perforator register;

Fig. 19 shows the perforator magnet check circuit for the A and B digits and certain of the line pattern connector relays;

Fig. 20 shows the message unit perforator advance check circuit and the perforator connector relays;

Fig. 21 shows the perforator magnet check circuit for the C to F digits, inclusive, certain of the line pattern connector relays and the registers for supplying activating grounds to the line pattern relays;

Fig. 22 shows the perforator connector relays and indicates the perforators with the paper advance magnet of each; and Fig. 23 is a sequence chart showing a large number of reading intervals of the reader and indicating the operations of the input and the output operations following within these intervals in sequence and indicating the point at which the routine test of the paper advance magnet holding circuit is tested.

In the following description the various relays are designated by both letters and numerals which have come to have certain significance to persons familiar with the technical details of the disclosed arrangements. By way of example, the reading relays are known as the A0, A1 and A2 relays for the first group thereof used to register the A digit of the six-digit line used in the automatic accounting system tapes. In the present case, there are three relays in the first or A set and five relays such as the B0, B1, B2, B4 and B7 relays in each of the remaining five sets. In a great many cases a relay will have only such an alphabetic designation but in other cases it will have in addition a numerical designation which always consists of the figure number plus two other digits, whereby the location of a piece of apparatus can be at once found by turning to the corresponding figure number. Where conductors are designated by numerals in addition to the usual alphabetic designation thereof the number used will be a combination including the figure number wherein the conductor is first picked up in the tracing of a circuit and this number will be retained even though the conductors extend through another large number of circuits. Another convention used herein for the sake of clarity is a numbering scheme for the cables or bundles of conductors which must be carried over long distances. This is the use of a hyphenated number such as 29-118 indicating that this cable or bundle of conductors extends between Fig. 29 and Fig. 118.

For obvious purposes, in certain cases, conductors will bear the same alphabetic designation as other apparatus. This is not to be taken as a duplication of the designation but will be readily understood that such a conductor bears an intimate relation to the other piece of apparatus.

Similar logical means for designating various elements of the circuits will be found in the drawings and are used as an aid to the clear understanding of the present arrangement.

Figure 1:
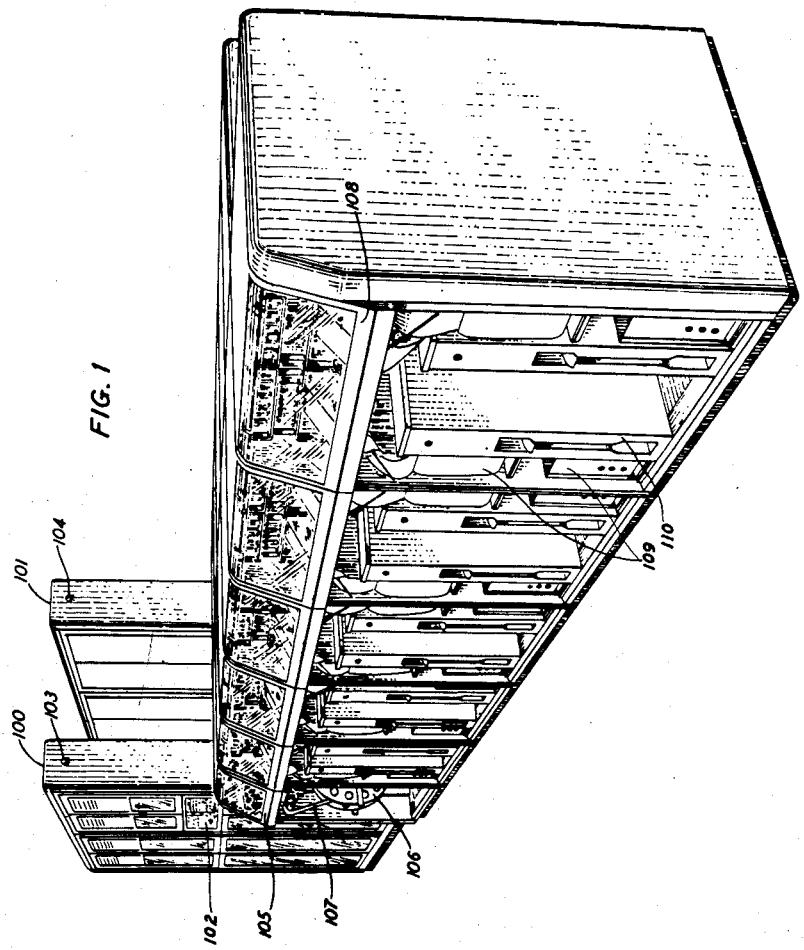
Fig. 1 is a perspective view of the racks and cabinets in which the device of the present invention is housed and is intended to give a general view of the device.

The exemplified embodiment of the present invention, as disclosed herein, comprises apparatus mounted in practice in or upon a cabinet or cabinets, a control panel, and a relay rack of the general nature illustrated in Fig. 1. Many mechanical details of the mounting arrangement are not disclosed herein either because they are well known in the art, would readily be devised by those skilled in the art, or described and disclosed elsewhere, or for a combination of these reasons.

The operative apparatus includes relays, a tape reader, tape perforators, otherwise designatable as recorders, and auxiliary equipment for supplying tape and storing the used or reproduced tapes.

The tape reader is disclosed in the application of W. W. Carpenter Serial No. 666,280, filed May 1, 1946; obviously other devices of similar function may be employed.

The tape perforators may consist of devices such as disclosed in the application of W. W. Carpenter Serial No. 588,401, filed April 14, 1945, now Patent No. 2,583,086, issued January 22, 1952.

The disclosure of the present application is related to the disclosures of a group of patents and applications generally relating to equipment which may constitute an accounting office. The object of an accounting office from the over-all viewpoint is to process a tape of the kind produced in a central office having recorded thereon data relative to telephone calls specifically originating in or, more generally, set up through or by means of said central office and to process said tape with the ultimate result of producing through successive steps typed records giving the details of toll calls made by each subscriber during a given period of time, typed message unit records giving the number of units to be charged to each subscriber for a given period of time in cases where such subscribers are billed on a total message unit basis, and typed records of so-called straddle calls, i. e., those in which, for one reason or another, the answer, the disconnect, or the initial entry relating to a call are present on more than one tape. Within the scope of the invention certain other information may be derived and produced as a typed record, for example, line observing information, verification of numbers of newly connected subscribers, etc.

A tape suitable for initial use in an accounting office of the class referred to may be one produced in accordance with the disclosure of the application of Cahill-Carpenter-Dimond Serial No. 57,388, filed October 29, 1948, now Patent No. 2,599,358, issued June 3, 1952, or the equivalent thereof.

Such a tape may contain entries resulting from the use of many transmission circuits (which may be known as district junctors or by other designations) of the central office. In such tapes the initial entries contain, among other information, the calling subscriber line number, answer entries, disconnect entries, and day and hour entries. Because a single recorder may be used in common to and ordinarily is used in common to a number of transmission circuits, the initial, the answer, and disconnect entries of a particular call are interspersed with entries relating to other calls. Initial entries of calls never answered may also be recorded. However, each such entry is identified by the transmission circuit used for the purpose of this call and the number of this circuit forms a part of the entry record.

These trunk or transmission circuit number entries serve an essential purpose in the first processing of the single office tape which is sometimes referred to as assembling. The nature of the assembling process and a disclosure of equipment for accomplishing it is found in the Carpenter-Gooderham Patent 2,558,476, dated June 26, 1951, which resulted from application Serial No. 724,992, filed January 29, 1947.

The assembling process results in a series of tapes which, when spliced together in proper order, comprises the input tape for the apparatus disclosed in this present application.

The present invention disclosed and claimed herein consists of certain features of an accounting office now embodied in equipment known as a computer and which is sometimes more specifically designated as a computer-sorter because it may accomplish certain sorting functions.

A more elaborate disclosure of the computer is found in the application of A. E. Joel, Jr. Serial No. 101,087, filed concurrently herewith.

General appearance

The general appearance of one embodiment of the invention is given in the perspective view in Fig. 1. There are two cabinets 100 and 101 in which the relays and other small apparatus are mounted. The key and lamp panel are indicated at 102 and contain the set-up switches, the various lamps and the keys used in investigating the condition of the computer at any time, particularly after an alarm has been brought in. Two main alarm lamps 103 and 104 are indicated as being mounted near the top of the relay cabinets and are in such a position that they can be seen from any part of the large room in which this piece of apparatus is mounted along with similar appearing apparatus for the assembler, the sorter, the summarizer and the printer. Shown in this view, there are six cabinets of which the first one 105 houses the reader. A reel 106 below the reader holds a long length of tape such as 107 which feeds into the reader above and after being processed is returned to and wound on another reel. Each of the other cabinets such as the right-hand end one 108 houses a pair of perforators. In each of these cabinets there is mounted a bin such as 109 containing a long length of unperforated tape which after being processed by the perforator is fed into another bin 110. The computer may contain as many as nineteen perforators as will be explained hereinafter and each customer charge as it is computed is sorted by being selectively perforated on one or another of the various output tapes.

General operation

Fig. 2 is what might be termed a thumb-nail sketch to explain the organization of the device forming the subject-matter of the present invention. It consists of a reader 200 for reading the perforations on an incoming tape representing items of information comprising the gathered and assembled data for customer or subscriber charges. As the various codes are sensed by the reader they are then distributed by means of the register connectors 201 to registers 202. The registers here represent a temporary holding means for the information, part of which is used for calculating purposes or for internal rearrangement and is reregistered and part of which is retained in its original form before being routed to output tapes. At any rate a selecting means, here shown as the line pattern connector 203 is employed to glean from the registers selected bits and items of information and then through another distributing arrangement, the perforator connector 204 to route the computed charge data to the various perforators 205 whereby a plurality of output tapes are formed.

There are two communication channels, or trunks, one to transmit the incoming data from the reader to the registers and the other to transmit the outgoing data from the registers to the tape perforators. The registers form the heart of the device, for it is within this arrangement that the information is processed and held ready for the output circuit to make its selection and its records.

This Fig. 2 will then be regarded as a backbone or skeleton for the more elaborate schematic shown in Figs. 4 to 13, here arranged as shown in Fig. 3.

In this general schematic of the system, the input or reading means is shown in Fig. 4. This consists of a reader 400, a device essentially for the sensing of the twenty-eight code perforations in the automatic accounting system tape, incoming to this unit of the system and which had been produced as an output tape by the assembler. The reader consists of an assemblage of twenty-eight pins which seek to pierce the holes perforated in corresponding positions of the tape, those which succeed, signaling the achievement by connecting ground to a corresponding conductor and those whose path is blocked by unperforated tape holding their corresponding conductors open.

The twenty-eight conductors connected to the twenty-eight reader pins pass through the contacts of the reader connector 401 by means of which they may be connected as determined by the control circuits to the reading relays. In the case of the first three of these conductors representing the code for the first or A digit, an additional break is placed in the path of these conductors consisting of the make contacts of the ST3 start relay 402 in the off-normal and start circuit 403 so that the A digit codes cannot operate the A digit reading relays until the device has been properly started and is in satisfactory operation.

The coded grounds are thus extended to and operate the reading relays during the reading interval and so far as the registers into which the codes are read merely act to relay the ground signals from the reader. However, the reader closes but a single path whereas each reading relay controls a plurality of contact sets whereby the validity of a code may be tested and various other control circuits may be closed whereby the item of information contained in a code being read by the reader not only may be forwarded to a register but a part of the code may be used for control and other operations.

As clearly indicated in Fig. 4, the twenty-eight places of the code are allotted three for the first or A digit and five for each of the following five B, C, D, E and F digits. The A digit reading relays 404 consist of the A0, A1 and A2 relays and are used to index the line read and to thus classify the information contained in the other five digits.

By way of example, a zero in the A digit, signaled by the operation of the A0 relay, may be a splice code or a supplementary line of an initial entry, a 1 in the A digit, is a timing entry such as the disconnect or the answer time, the 2 in the A digit may be the first line of an initial entry, one of the tape identity codes or some special code and lastly a 3, signaled by the simultaneous operation of all three A0, A1 and A2 relays may be a special code such as a timed release at the disconnect time.

Each of the remaining five digit groups of reading relays such as the B digit group 405 have five relays designated 0, 1, 2, 4 and 7 and are known as a two-out-of-five group, since the code to express any one of the ten digits consists of the energization of two out of the five available relays in such a combination that the sum of their designations equals the digit expressed. An exception to this general rule is that the operation of the 4 and the 7 relays expresses the digit 0.

The splice code 081010 is then expressed by the operation of the A0 relay in the A digit group 404, the B1 and B7 relays in the B digit group 405, the C0 and C1 relays in the C digit group 406, the D4 and D7 relays in the D digit group 407, the E0 and E1 relays in the E digit group 408 and the F4 and F7 relays in the F digit group 409. Other codes are expressed in like manner.

The tape identity codes are those which have the same first three digits 289 and count from 2891XX to 2899XX so that in this case the 289 is used for certain control purposes, the 1 to 9 in the D digit for counting purposes and generally only the last two, the E and F digits for actual information purposes.

When it comes to the actual information codes, such as the timing entries and the initial entries, then only the A digit is used for indexing purposes and the rest are all used for true informational purposes.

Other entries interspersed with the three informational codes above, such as the hour entries contain actual information in only the last two or three digits and identification of the entry in the others or at least in the first four or three thereof.

The computer is prepared for operation by adjusting a plurality of set-up switches to express information concerning a tape to be processed. Such switches are here represented by the E and F set-up switches 1100 and 1101, respectively, and by means of such switches the following information may be established:

1. Sort of MU calls to be effected
2. Marker group—tens
3. Marker group—units
4. First recorder—tens
5. First recoder—units
6. Last recorder—tens
7. Last recorder—units
8. Day of round—first
9. Day of round—last
10. Month—tens
11. Month—units
12. Round All of this information with the exception of the first will be found in the tape identity codes and these codes must check by automatic circuit operation against the setting of the switches before operation of the device may proceed.

After the set-up switches are adjusted and the incoming tape has been introduced in the reader the tape end key is operated temporarily and then the start key is operated. It is necessary to operate the tape end key first because the ends of all output tapes must be prepared before the computer can go into operation and, therefore, the circuit is so arranged that until the tape end key has been operated and then restored the operation of the start key will be ineffective. Once the tape end key has been operated the operation becomes automatic and twenty-seven or some multiple thereof of the splice code will be perforated in all the output tapes. In accordance with certain arrangements which will be fully explained hereinafter, nine codes are spread over the output tapes and this is repeated three times. If the tape end key is restored before this operation is complete, then the operation will halt after each output tape has had twenty-seven splice codes perforated therein, otherwise the operation will be automatically repeated. Thereafter, the start key will be effective.

In the lower part of Fig. 11 the rectangle 1102 represents the entry spread progress circuit and consists of a sequence arrangement known as a walking circuit, whereby the ten MU perforators are operated in turn followed in order by the perforators for the straddle tape, the line observing tape, the MU detail tape, and the six detail tapes or any selection of these which may be determined by the nature of the incoming tape and recorder on the set-up switches. These various perforators, or rather means to sequentially render them operative to perforate a given code are here represented by the relays such as the MU0 relay 1103 at the left to the DET6 relay 1104 at the left.

The control of this entry spread progress circuit over the perforators is here shown schematically by the conductors such as the 0 conductor 1105 controlled by the MU0 relay 1103 and the 6 conductor 1106 controlled by the DET6 relay 1104 which may be effectively traced over the path 1107 through the day sort control 1300 and the perforator register 1301 to the perforator connector relays such as the P-0 relay 1302 and the P-18 relay 1303. Thus, the perforators such as the PERF.0 designated 1304 and the PERF.18 designated 1305 may be sequentially connected to the trunk for controlling the perforations to be made.

This trunk consisting of twenty-eight conductors extends from the line pattern connector 1108, through Fig. 12 and Fig. 13 to the twenty-eight relay A0 to F7 here shown as the perforator check circuit 1306.

The 081010 splice pattern code is formed in the line pattern connector 1108 employed for the end of tape preparation. In this rectangle, there is indicated the 081 relay 1109 which will extend grounds to the conductors of the perforator code trunk described so that each perforator as it is sequentially connected to this trunk will, as before stated, perforate a series of nine splice pattern codes, to be repeated three times.

It may now be assumed that the tape end key is restored and the start key is operated so that the device will go into operation. The splice code on the end of the incoming tape will be passed through the reader until the tape identity codes are encountered. These are nine codes 2891XX to 2899XX in order. The first of these must have the tape index 02, indicating that the incoming tape is one prepared in a second sort operation by the assembler. In the computer then the first code encountered after the splice pattern is 289102 and no other code will advance the operation of this device to further operations. It may also be noted at this point that no other accounting system device will accept this tape except the printer when set for verbatim printing.

The tape identity codes are then read by the reader, each in turn, and the information they carry is checked against the information expressed by the setting of the switches such as 1100 and 1101, also here generally indicated by the rectangle 500. Each of the codes 2891 to 2899, inclusive, will be expressed by the A, B, C and D digit reading relays and passed to the tape identity progress circuit 501 wherein a series of relays such as L1 relay 502 and L9 relay 503 will respond as each line is checked. As each line proves satisfactory a signal is given over the RS1 lead 504 to operate the RS1 reader step relay 700 to properly advance the tape in the reader to the next code. On the last line the reader step relay is not operated immediately but held until this information can be spread on the output tapes. When the full nine lines of the tape identity codes have been checked, then the IC tape identification check relay is operated, and this will start the next operation by which the tape identification is spread on the prepared ends of each output tape, the complete nine lines on one tape and corresponding lines then repeated on the next tape under control of the entry spread progress circuit 1102. The TIE, tape identification ended relay 505 operates after all the tape identification codes have been perforated in all tapes.

The specific information for each line of tape identification is derived from the setting of the set-up switches such as 1100 and 1101 under control of the line pattern connector 1108 for the end of tape, such information being transmitted over the output trunk to the perforators such as 1304 and 1305.

The ouput tape ends having been prepared and a reader step relay having been operated, the first code of the time group having an item of general information is read. This is the recorder number in the form 280XTU where the D digit (X) is used to indicate that the recorder is a regular or an emergency unit and the E and F digits provide the tens and units digits of any recorder number from 00 to 19.

The A digit reading relays are shown here as exercising a control over the control circuits 506 and these in turn over the paths 507 and 600 as controlling the recorder register connector 701. If no recorder number has been registered then the RCRA relay 702 will be operated to register the D, E and F digits being read by the reader in appropriate parts of the recorder register 703. It may be noted at this time that where the recorder number code is encountered again at the beginning of another section of the incoming tape, the RCCA comparing relay 704 will be operated so that the recorder number may be compared with the number previously registered.

The next code is the hour code, 2811TU, and now the control circuits 506, over the path 601 cause the operation of the hour register connector 602 to register in the earlier hour register 900 this hour entry (generally 03). If this is as now assumed the first hour entry, then the H1A-B relay 604 is operated to register the hour as read. It may be noted that each subsequent hour entry, 2810TU, is through the H0A-B relay 603 whereby the value of the hour is reduced by 1 as it is transmitted to the earlier hour register 900.

The hour having been registered in the earlier hour register it is now transferred through the hour transfer check connector 901 to the current or disconnect hour register 902. This being the first hour entry such transfer takes place immediately. Where, under other circumstances, there is an existing registration in the disconnect hour register 902, then a check is made to see that the hour registered in the earlier hour register is one less in value than such existing registration and when this is proved the said existing registration is released and that in the earlier hour register 900 is transferred to the disconnect hour register 902.

The third and final item of general information is the calendar day code, in the form 2821TU, where T and U stand for the tens and units digits of the actual calendar day. Again the control circuits 506 over the path 601 operate the day register connector 605, and the registration is made in the day register 903. This is made in the decimal code, there being four tens relays representing the 0, 1, 2 and 3 for the tens digits of the calendar day and a full complement of ten units digits. When this registration is complete the computer is ready to proceed to its main duties.

It may be noted that the central office tape having been passed through the assembler twice, once on a units digit sort and once on a tens digit sort there may be as many as one hundred sections in the 289102 tape coming to the computer. These time group entries will follow the splice code in every case and, therefore, the processing of each section of a tape is preceded by the reading of these three, recorder, hour and day entries. During the processing of a tape section, there may be regular hour entries and these will adjust not only the hour registration but the day registration, for as the hour changes from 00 to 23, at midnight, the date also changes. This usually results in the diminution of the date by 1 but may entail a complete change, such as from 1 to 31, 30, 29 or 28.

The recorder, hour and day entries are not copied on any one of the output tapes but the registrations are held available to the line pattern connector whereby bits of information are gleamed from different sources to form the required output lines.

The computer acts as a sorting device to sort the various charges into different categories, such as message unit charges, toll charges, detailed records, line observing records and irregular records as well as discards. In addition, in single office marker groups, the message unit calls may be further sorted by one digit of their directory numbers. Tapes from multioffice marker groups must be sorted by offices. Where the incoming tape from the assembler contains records for more than one day the detail records may be sorted in days. The controls for these different sorting operations are primarily responsive to the information in the initial entries and are further vested in the set-up switches and certain auxiliary circuits as will more fully appear hereinafter.

A regular message unit (MU) call record consists of three entries, the disconnect time, the answer time and the initial entry and it is not known that this is a message unit record until the initial entry is reached. However, the disconnect time and the answer time are registered and transmitted to the calculator and generally the elapsed time is calculated before the initial entry is registered. All three entries, however, must bear the same call identity index. This is registered upon the registration of the disconnect time and the index with each of the next two entries is compared with it.

Let us take as an example a call made by a subscriber at station SUmmit 6-5444, within the period covered by a record about to be processed. The initial entry for such a call, which happened to be made over a facility identified by the call identity index 27 would be 213027
035444 in which the message billing index (digit C of the first line) is assumed to be 3 and the office index (digit B of the second or first supplementary line) is 3 and which combined with the marker group would identify the office SUmmit 6.

Let it be assumed that the call was answered at 11.535 and the disconnect took place at 11.582. The answer timing entry would then be

153527 and the disconnect timing entry would be

158227

Now this call would have been assembled by the assembler and recorded in such manner that it would now be read by the computer in the form:

158227
153527
213027
035444

Therefore, the reader may now be assumed to read the first of these lines:

158227

The control circuits 506, over the path 600, cause the operation of the DTRA-B relay 705 in the timing entry register connector 706 so that the B, C and D digits thereof may be transmitted through the B, C and D sections of the disconnect time translator designated 1000, 1001 and 1002, respectively, whereupon the three digits 5, 8 and 2 are translated from the two-out-of-five code to the biquinary code, which is peculiarly well adapted for calculation. After translation these three digits are transmitted to the adder 1003 where they are registered in the TD (tens, disconnect), UD (units, disconnect) and PD (tenths, disconnect) adder relays.

At the same time the disconnect time is transmitted to the disconnect time register where a record of this data may be retained until it is certain that it is no longer needed. The arrangement of the disconnect time register 606 and the disconnect time translators 1000, 1001 and 1002 is such that while both are operated by the reader, the latter are then held operated by the register 606. In this sense, the register is needed until the call has been disposed of. However, the register 606 has a regular output which may not always be used. In a regular MU call it is not needed but in a detail call or an irregular call it will be needed. It is, therefore, registered in the disconnect time register until the processing of the data for this call is completed.

The E and F digits 2 and 7, respectively, of this first line of the entry constitute the call identify index and must be registered to identify later entries of this same call. Accordingly, when this line is read by the reader the control circuits 506, over the path 607, cause the operation of the DJR2 relay 608 whereby the E and F readings of the code are transmitted over path 609 to the call identity index register and decimal translator 800. The call identity index is, therefore, retained for reference purposes and for comparison with the call identity index readings of the succeeding entries of this call.

When the disconnect time register 606 up-check circuit and the call identity index register 800 up-check circuits are closed showing a proper registration of this entry, the RSI reader step relay 700 (circuits not indicated) is operated and the reader is advanced to read the next entry, the answer time.

The answer time line

153527 is now read by the reader. The control circuits 506, over path 600 now cause the operation of the ATRA-B relay 707 whereby the B, C and D digits 535 of this line are transmitted to the B, C and D answer time translators 1004, 1005 and 1006, respectively, for transmission on a biquinary basis to the TA, UA and PA relays of the adder 1003.

As soon as the adder up-check circuits report a satisfactory registration the elapsed time will be calculated. The method of calculating is to express the addend in its natural form, the augend at its nine's complement, to add in a one in the lowest denominational order and to ignore, or throw away the carry-one out of the highest denominational order. Thus, where the disconnect time is 58.2 and the answer time is 53.5 the elapsed time is 4.7 and this is arrived at by adding 582
464
1
---
1047 wherein the left-hand 1 is discarded so that the result becomes 047.

There are, however, other considerations in calculating the elapsed time and hence the value calculated in the tens order is carried through the hour tens adder 1008 so that 6 (for 60 minutes) or some multiple thereof may be added if there have been one or more hour entries between the disconnect entry and the answer time entry. In the present case we assume there have been no such entries and hence the value 0 is transmitted through the hour tens adder 1008 without change, and the three digits 047 are brought into the elapsed time round-off translator 1307, each to its corresponding denominational order. In actual practice, a small time allowance to cover traffic delay in establishing a connection after the called party has answered and delay in recording the disconnect signal is made and then the call is rounded off to the next higher minute. The details of these operations carried out in the elapsed time round-off translator 1307 are described in detail hereinafter. The output of these translators is chargeable time and as such will be used as described hereinafter. The carry-out from the tens translator goes into the control circuits (not shown) for purposes to be described. The carry-out 0 will indicate a negative result while the carry-out 1 will indicate a normal positive result and will constitute a signal to advance the operations.

As in the case of the disconnect time, the answer time also is registered in the answer time register 708. When the answer time up-check circuit is closed the AUC relay 709 is operated providing the call identity index also checks and the RS1 reader step relay is also operated to advance the reader to the first line of the initial entry.

Upon the operation of the ATRA-B answer time register connector relay 707 a ground is extended directly to the JCT-JCU call index check connector relay 610 whereby the E and F digits of the answer time line (constituting the call identity index) are extended for comparison with the call identity index already registered in the call identity index register and decimal translator 800. If the comparison of these numbers proves them to be identical then a check circuit combined with the up-check circuit for the answer time register 708 will cause the operation of the reader step control to advance the tape in the reader so that the first line of the initial entry may be read.

The first line of the initial entry is now read by the reader. The A digit is 2 and since this has been assumed to be an MU record the B digit is 1. The B digit in the first line of each initial entry indicates the general character, message unit, detail or line observing and will cause the operation of a corresponding relay in the input class register 509 which is of prime importance in the later operation of the output class register 1111. In this case the control circuits 506 over the path 607 operate the CLRA-B relay 611. The value in the C digit is transmitted to the billing index register 801 and the call index check connector 612 is operated as before to check the call identity index in the register 800.

The reader line count circuit 508 may actually be considered part of the control circuits 506 and is shown as being operated from the same source and as having a control over these control circuits. It functions to keep a count of the lines of code read for each group of lines constituting the charge data for each call. It is a steering means and is shown as providing a path for the connector relays for the supplementary lines of the initial entry.

Thus, on the first supplementary line of the initial entry which follows the proper entry of the first line and the successful comparison of the call identity index, the reader line count circuit 508 will cause the operation of the NRA-B-C calling number connector relay 613. Thereupon, the B, C, D, E and F digits of this supplementary line will be transferred to and registered in the calling number register and decimal translator 802, so that the output line or lines are now ready to be perforated if everything has been regular.

The B, C and F digits have output paths leading through the sort class connector 1110 to control the sorting of the call in accordance with predetermined conditions, particularly as recorded on the set-up switches.

Meanwhile, during the reading of the lines of the initial entry the computation of the elapsed time has taken place, so that during the registration of the last supplementary line the output is prepared. Assuming everything to be regular and the chargeable time to indicate nine or less message units, then the charge data becomes a single line transmitted to the particular output perforator selected by the sort class connector 1110 and the value of the digit registered in the calling number register 802. Under control of the output class register the DN directory number pattern forming relay 1200 will be operated to control the pattern of the output.

The number of message units is calculated from the computed chargeable time. The output of the elapsed time round-off translator 1307 is transmitted through the message units formula circuit 1201, under control of its connector 1202 and the calculated message units are registered in the message units register 1203. It may be noted that the chargeable time is in some cases also transmitted through the chargeable time translator 1204 and registered in the chargeable time register 1205 where it is available where details are wanted. In the case under assumption it is not needed and will not be used. However, the number of message units calculated and which have been assumed to be capable of being expressed in one digit are available over the F path coming out of the message units register 1203 and are transmitted by the BK1-A relay 1112 in the output class register 1111 to the B group of contacts of the DN relay 1200 so that the B digit of the output line will contain the computed charge in message units.

The calling line number transmitted from the C, D, E and F parts of the calling number register 802 to the C, D, E and F contacts of the DN relay 1200 so that these digits of the output line will contain this calling line number.

The A digit of the ouput line is formed through the operation of one of the relays in the ouput class register 1111, such as the BK1-B relay 1113 so that this is recorded as 1.

Had the number of message units calculated been ten or over and, therefore, been capable of expression only in two decimal digits, then the output becomes a two-line entry with the DN pattern relay 1200 operated for the first and the TMU relay 1206 operated for the second line. In this case, the A digit of the first of these lines is recorded as 2 under control of the BK2-B relay 1114, and the B digit is recorded as 0 under control of the same relay (path not shown). The C, D, E and F digits are derived as before from the calling number register 802.

The second line is formed by the TMU relay 1206. The A and B digits both become 0 under control of one of the relays in the output class register such as the BK2-B relay 1114. The computer connector and control circuit 805 may be set to operate through the call type translator 907 to change the record in the B digit through the TMU relay 1206 from a 0 to a 1 or 2.

The C and D digits are invariably zeros in this line under control of the DAB relay 1115.

The E and F digits are supplied by the output of the message units register 1203.

As each output line is perforated the perforator check circuit 1306 reports the progress of the operations to the perforator control circuits 1309 and after a complete set of charge data lines have been perforated on a selected output tape the individual and specific operating units are released and made ready for another call. Items of general information, such as the hour and the day are retained since this information is common to all the calls within a given section of tape. In actual service there is an overlap operation of elements of the device, consisting of the release of the disconnect and answer registers as soon as it is determined that sufficient information has been stored for the perforation of an output tape. Thus, the disconnect and answer registers may be cleared before the computer has completed its task and the disconnect time and the answer time for the next call may be in process of being registered and may even be completely registered before the remainder of the device is released.

It is not necessary to describe in detail the complete operation in other types of calls. All or groups of items of information representing the data for each customer charge consists of three items, a disconnect time, an answer time and an initial entry. In each case the two timing entries are entered first so that they may be placed in the adder at the earliest possible moment so that the computation of the elapsed time may be made as the remaining information is being entered. The simplest case has been described in which certain of the apparatus provided has not been used. In the more complex cases such as the toll or detail call the area and called office register 803 and the called number register 804 are called into use to store information contained in the initial entry and from which information is gleaned by the pattern relays of Figs. 12 and 13 for forming the output lines.

One of the important items on all calls in which the details of the charge are reported is the start time line. This is a line coded from six digits of the day, hour and minutes at which the call is started, generally speaking, the answer time. The tens and units digits of the calendar day are taken from the day register 903, passed through the connector 904 to the day register translator 905 from which the tens digit is passed to the start time line register 906 for combination with the minutes tens digit from the answer time tens translator 1004 to form the B digit of the start time line. In a similar manner, the hour tens digit is taken from the disconnect hour register 902, passed through the start time line register connector 908 and combined in the start time line register with the minutes tens digit from translator 1004 to form the C digit of the start time line. The B and C digits thus formed are transmitted to contacts of the TM pattern relay 1308 for use as required. The D digit of the start time line is the units day digit and, therefore, is the F digit coming out of the day register translator 905. The E digit of the start time line is the units hour digit and, therefore, is the units digit taken from the current or disconnect hour register 902, passed through the start time line register connector 908 and registered in the time pattern register 909. The F digit of the start time line is the units digit of the minutes and comes from the units section of the answer time register 708 and is passed through the start time line register connector 908 and registered in the time pattern register 909.

Thus, the main elements of the computer and their cooperative relationship to each other have been briefly noted and may be summarized as follows: The computer consists of a reader for reading off items of information from an incoming tape, a plurality of registers and translators for storing the information, a calculator for computing charges, a pattern circuit for supervising the lines of a computed charge and a plurality of perforators, selectively taken into service for recording the computed charges under control of the reader.

Supplementary to these regularly employed elements is the straddle circuit which has supervisory functions and acts to keep a contstant watch on the operations of the computer so that if there is any deviation from regularity the control is seized and the call is then disposed of under direct control of this circuit. Certain calls such as don't answer and busy calls are discarded and others are recorded on a straddle tape where full details may be spread before a clerk for proper disposition. The important element in this circuit is the entry progress register which has a connection from each of the registers to report the proper operation thereof. Herein is shown, by way of example, the path 614 leading from the disconnect time register 606 to the entry progress register 510 to report the proper entry of the disconnect time. Should the disconnect time fail of registration and the other elements of the call be properly registered then the entry progress register would report a call with only one timing entry and if this were at a leading tape end the straddle input register 511 would be operated, in turn operating the straddle output register so that details of the call would be reported on the straddle tape. There are numerous circumstances by which the straddle circuit takes charge of the output circuit, dealing with numerous causes of irregular calls, all of which are more fully described in the said Joel application.

*The characteristic features of the invention*

One of the features of the present invention has been stated to be the routine circuit for occasionally testing the perforator advance magnet holding circuit. The normal operation of the system is for the output lines of a computed customer charge to be perforated on a selected output tape as soon as such charge has been computed and the output circuit started. However, here as elsewhere in these accounting system devices, check circuits and guard circuits are employed to insure the correctness of the customer charges issued to the end that neither the utility company is denied its charges due nor the customer victimized by any erroneous operation of the apparatus. Hence, a guard circuit is employed to lock in the perforator advance magnet once it has been operated to prevent the advance of the output tape until it becomes certain that the output line perforated is valid. Therefore, a validity circuit is employed to open this guard circuit and allow the normal operation of the perforator to proceed. Should the guard circuit fail, the normal operation of the perforator would not be hindered with the exception that in the extremely unlikely event that if an invalid line were perforated there would be no means to prevent its issuance, that is, the advance of the perforator tape with such an invalid output line. Therefore, the ability of the guard circuit to perform its duty if and when it is called upon to do so will be tested in routine manner prior to the use of the output circuit by making such a test and rendering the starting of the output circuit dependent upon the outcome of such a test.

In the schematic circuit diagram of Figs. 15 to 22, the operation in short will be as follows: When the LK relay 1504 is released after the perforation of a customer charge, then the routine circuit will be established on the next reader interval to operate the PH relay 1500. The PH relay will operate only if the entire holding circuit is intact and in operating will cause the operation of the PM relay 1508 and this relay in turn will close a circuit so that the PHI relay 1501 is placed in series with the PH relay but is not operated during the reading interval when the J0 contact of the reader is closed. However, at the end of this interval when the J0 contact opens, then the PHI relay 1501 will operate in series with the PH relay 1500 and hold this latter relay operated. As soon as both the PH and PHI relays are operated a circuit will be established for the STA start relay 1502 and this relay will establish a circuit for the LK relay 1504 which will then operate and remain operated until the customer charge is completely perforated in the output tape.

The operation of the PH relay is over a long circuit having many multiple taps therefrom but which is in reality a series circuit so that the operation of the PH relay will prove that every part of this circuit is intact. The circuit may be traced from the J0 contact in the reader 1509 over the JM0 conductor where it is connected to the armature 1 of the DN pattern relay 1900. There is also connected to this armature another wire extending to a similar point of the DN1 relay 1901 so that the circuit in effect is a series circuit from the J0 contact to the armature 1 of the DN relay, thence to the armature 1 of the DN1 relay and so on to the JMO1 conductor which may be traced back to the front contact of the PS relay 1510 at which point another wire is connected leading to the back contact of armature 1 of the CKE relay 1511, thence over the back contact and armature 1 of the LK relay 1504 which is now released, the front contact and armature 2 of the ST5 relay 1503 (a start relay operated at this time), thence over a wire connected to the front contact of the PM relay 1508, thence over another wire connected to this same point, over the PM1 conductor which is one of the two wires soldered to the front contact of armature 1 of the LTD pattern relay 1902 and thence in series and through soldered connections to the front contacts of each of the other pattern relays to the PM conductor, through the winding of the PM relay 1508, over another PM conductor which may be traced to a soldered connection to the armature of the P18A–B perforator 18 connector, relay 2000 and thence in series through soldered connections to similar armatures of each of the other perforator connector relays, thence through the back contact and armature 3 of the P0D perforator zero relay 1800 and in series through the back contact and armature of each of the other P–D relay to the CKB conductor, over the armature 2 and back contact of the LK relay 1504 through the winding of the PH relay 1500 to battery. If this circuit is completely closed through each of the numerous soldered connections mentioned, then the PH relay will operate and at the same time will cause the PM relay 1508 to operate. Upon the operation of the PM relay a circuit will be closed from ground through the winding of the PHI relay 1501 through the back contact and armature of the PS relay 1510, the armature and front contact of the PM relay 1508 and thence over the remainder of the circuit heretofore traced to the PH relay 1500. It will be noted that the winding of the PHI relay 1501 is shunted at this time by the J0 contact 1509 and, therefore, the PHI relay will not operate until this J0 contact in the reader 1509 is open. At that time the PHI relay 1501 will operate to hold the PH relay 1500 operated and it will itself become operated.

The CKPI relay will be operated at this time from a ground on the armature and back contact of the CKC relay 1512, through the armature 6 and front contact of the ST5 relay 1503, through the winding of the CKPI relay 1505 and the CKP relay 1513 in series. Without going into the details at this time, it may be noted that the SCK relay 1506 which is the synchronizing check for straddle and calculator functions relay will be operated at this time. Therefore, a circuit may be traced from ground, the armature 1 and front contact of the CKPI relay 1505, the front contact and armature 1 of the SCK relay 1506, the front contact and armature of the PH relay 1500, the front contacts and armature of the PHI relay 1501, the armature 7 and back contact of the AV relay 1507, the front contact and armature 3 of the ST5 relay 1503, a conductor STA1 and thence through a series circuit comprising a back contact and armature of each of the PLA– relays such as the PLA8 relay 1708 and the PLA1 relay 1701, back over the STA conductor to the winding of the STA start relay 1502. Thus, the start relay is operated and as a result thereof a circuit is closed for the LK relay 1504 which may be traced from the KM4 contact in the reader 1509, through the front contact and armature 5 of the ST5 relay 1503, over the LKL1 conductor which may be traced through a series circuit comprising the armature and back contact of each of the PL– relays such as the PL9 relay 1709 and ending at the armature and back contact of the PL2 relay 1702, thence through the back contact and armature 5 of the PLA1 relay 1701, over the LK conductor, through the front contact and armature 4 of the STA relay 1502 and thence through the winding of the LK relay 1504 to battery. The operation of the LK relay opens the circuit for the PH relay and thus allows both the PH relay 1500 and the PHI relay to release so that the circuit is now ready for operating the first relay of the output line count circuit and thence the line pattern relay in accordance with the output class register. The circuit of the PH relay 1500 is opened at the back contact and armature 2 of the LK relay 1504 and the circuit of the PHI relay 1501 is shunted through the front contact and armature 5 of the LK relay.

Let us now assume that a call being processed has proved to be a message unit call in which the number of message units exceeds 9. Therefore, the MU relay 1600, the MUA relay 1601 and one of the message unit tens relays such as the MUTI relay 1602 will be operated. Hence, upon the operation of the RPF regular call perforation start relay 1603 a circuit will be established from ground, armature 8 and front contact of the LK relay 1504, the armature 4 and back contact of the E2A–B relay 1515, the back contact and armature 3 of the EE2 relay 1516, the armature 3 and front contact of the STA relay 1502, the front contact and armature 4 of the RPF relay 1603, the armature 2 and front contact of the MUA–B relay 1600, the armature 7 and front contact of the MUA relay 1601, thence through an armature and front contact of one of the MUT relays such as the MUTI relay 1602 to the winding of the BK2 bulk two-line entry relay 1703.

A circuit may also be traced from ground, armature 7 and front contact of the LK relay 1504, armature 5 and front contact of the STA relay 1502, armature 3 and back contact of the E2A–B relay 1515, back contact and armature 2 of the EE2 relay 1516, the armature 3 and front contact of the MUA–B relay 1600, thence through a circuit shown here by a dotted line indicating a contact controlled by the BRO bulk register operated relay (not shown), through the front contact and armature 9 of the MUAA relay 1601, the back contact and armature 12 of the MUDA–B relay 1604, the back contact and armature 9 of the BI9 relay 1605, the front contact and armature 3 of the RPF relay 1603, the armature 1 and front contact of the MUA–B relay 1600, the armature 5 and front contact of the MUAA relay 1601, the DT conductor and thence through an armature and contact of one of the calling number register relays such as the office sort zero relay 1801, through one of the contacts and armatures of the OS1 relay 1802 operated now in accordance with the setting of the set-up switches indicated in the rectangle 1803 to the winding of one of the perforator connector relays such as the P0D relay 1800 in series with the P0A–B–C relays 2001. A circuit may now be traced from ground, armature 1 and back contact of the P18D relay 1804, and thence in a chain through back contacts and similar armatures of the other perforator connector relays to the front contact and armature 1 of the P0D relay 1800 and assuming that but a single one of these P–D relays such as the P0D relay 1800 is operated, this ground will be extended to the PD conductor and thence through a front contact and armature of the BK2 relay 1703 over the CK1 conductor, the back contact and armature 5 of the E2A–B relay 1515, the back contact and armature 4 of the CKE relay 1511, the back contact and armature 2 of the SCK relay 1506 to the winding of the CKC relay 1512. The CKC relay opens the circuit of the CKP1 relay 1505 and the CKP relay 1513 so that these relays return to normal.

Upon the next reading interval a circuit is established from the P1 contact of the reader 1509, over the armature 2 and back contact of the CKP1 relay 1505, the front contact and armature 1 of the ST5 relay 1503 and thence in a circuit which divides in one direction to operate the OP relay 1517 (which now acts to bridge the point in this circuit just described as going through the armature and back contact of the CKP1 relay) and thence in the other direction over the OP conductor, through the armature and back contact of the MST relay 1705 and thence in a series circuit, through armatures and back contacts of the PL relays such as the PL9 relay 1709 to the armature 4 and front contact of the PL1 relay 1704, through an armature and front contact of the BK2 relay 1703 to cause the operation of the DN relay 1900.

A circuit may be traced from the armature and back contact of the SKT relay 1518, through the armature 4 and front contact of the ST5 relay 1503, armature 4 and front contact of the LK relay 1504, the LKA conductor and thence in a chain circuit through armatures and back contacts of each of the PLA– relays such as the PLA8 relay 1708 and the PLA1 relay 1071, over the PL11 conductor, through the armature 2 and front contact of the STA relay 1502, the PL1 conductor to cause the operation of the PL1 relay 1704.

Upon the operation of a pattern relay and the perforator connector relays, a circuit is established from the J0 contact in the reader 1509, over the JMO conductor, through the armature 1 and front contact of the DN relay 1900, the PM conductor, through the winding of the PM relay 1508, thence over a PM conductor to the armature 1 of the P18A–B–C relay 2000, over the series circuit to the armature 1 of the P0A–B–C relay 2001, the front contact thereof and thence in a series through the PK0 relay 2002 and the PAM paper advance magnet 2201 of the selected perforator. The paper advance magnet will thereby be operated and upon the operation of the PM relay a locking circuit therefor will be established from ground, armature 3 and front contact of the LK relay 1504, through the back contacts and armature of the PS relay 1510, the armature and front contact of the PM relay 1508, over the PM1 conductor to the front contact and armature 1 of the DN relay 1901 and thence over the circuit above traced through the PAM paper advance magnet 2201. Thus, the momentarily closed J contact of the reader is shunted by a direct ground from the LK relay 1504 until the validity of the operation of the punch magnets has been established.

It will be noted that there is a K relay such as the KA0 relay 1904 in series with each of the perforator magnets such as the A0 perforator magnet 2202 and, therefore, as the punch magnet is operated so will its check relay be operated.

Also, upon the operation of the DN relay 1900, a circuit is established from ground, the front contact and armature of the PC relay 1519 (operated during each reading interval), over the PA1 conductor, through the armature 2 and front contact of the DN relay 1900, the PA conductor, thence in a chain circuit through a back contact and armature of each of the PL relays such as the PL9 relay 1709 to the armature 2 and front contact of the PL1 relay 1704 and thence to the winding of the PLA1 relay 1701. The PLA1 relay 1701 and the PL1 relay 1704 in the perforator line count circuit are now operated. Therefore, a circuit may be traced from the ground, armature 1 and front contact of the CKP relay 1513, the back contact and armature 2 of the PH relay 1500, the back contacts and armature of the PH1 relay 1501, the PCK conductor, the armature 6 and front contact of the PLA1 relay 1701, the armature 1 and front contact of the PL1 relay 1704, the PCK conductor and thence through the validity circuit controlled by the perforator magnet check relays such as the KA0 relay 1904, the PCK conductor to the validity circuit controlled by the PK– relays such as the PK0 relay 2002 to the PS conductor leading to the winding of the PS relay 1510. The operation of the PS relay checks the validity of the code by which the perforator magnets are operated and the fact that one and one only perforator is enabled at this time. Therefore, the PS relay operates to open the locking circuit of the PAM magnet and transfers this locking circuit to the J0 contact so that the PAM magnet may release at the end of the reading interval and advance the paper. This locking circuit after the operation of the PS relay may be traced from the J0 contact of the reader 1509, over the JMO conductor and thence in a series circuit from armature 1 to armature 1 of each of the pattern relays to the JMO1 conductor leading to the front contact of the PS relay 1510 and thence to the armature of the PM relay 1508 so that the locking of the PAM magnet 2201 is transferred back to the J contact of the reader. Therefore, at the end of the reading interval the paper in the perforator is advanced.

It may also be noted that upon the operation of the POD relay 1800, the ground on the PS conductor is extended by armature 4 and front contact of the POD relay to the PSE conductor leading to the PS2 relay 1520 and this relay locks to the HB0 contact of the reader 1509 which is closed during the interval between the reading intervals and the PS2 relay, therefore, remains locked up after the PC relay releases. Therefore, at the end of the reading interval during which the first line of the output is perforated through the agency of the DN relay 1900, a circuit is established from ground, the armature and back contact of the PC relay 1519, the front contact and armature of the PS2 relay 1520, the PL conductor and thence in a chain circuit through the armatures and back contacts of the PLA– relays through the armature 4 and front contact of the PLA1 relay 1701 to the winding of the PL2 relay 1702.

Through the operation of the PL2 relay 1702 and the BK2 relay 1703 the TMU pattern relay 1903 will be operated to cause the perforation of the second and last output line.

We have assumed that this is a regular call and that the record made will be a two-line entry. Therefore, upon the operation of the TMU relay 1903 a circuit will be established from ground, armature 2 and front contact of the TMU relay, an armature and front contact of the BK2 relay, the back contact and armature 1 of the 2TB relay 1706, the LL conductor to cause the operation of the LL last line relay 1521. The LL relay causes the operation of the AV relay 1507 and with this relay operated and the PS2 relay 1520 operated to show a proper check on the operation of the odd or even-numbered perforator connector relays, then the LK relay 1504 will be released at the end of the reading interval during which this last line is perforated.

With the AV relay 1507 operated and the LK relay 1504 restored to normal the perforator control circuit will be ready to control the operations having to do with the next call. In this connection it may be noted in Fig. 23 where a total of 104 reading intervals has been shown in sequence that the various calls overlap each other. Thus, one call including two timing entries and a four-line initial entry occupies the first 6 reading intervals. The output from this occupies the reading intervals 8 to 12, inclusive, during which time the reader has attempted to enter information for the next call and has succeeded only in entering the two timing entries. The particular point of interest in this chart is to be noted by the indicator line labeled "check guard circuit" in which an arrow points, by way of example, to the reading interval 13 which is the first reading interval after the first output has been completed. At this point the LK relay, as hereinabove described, is first operated and this will remain locked then until the call for which it was operated has been completed so that at the end of the 22nd interval the LK relay will be released and again operated for the next call in interval 23.

There is one point that need be noted and that is that where one call results in an output recorded on two tapes, there is no routine test made of the perforator advance magnet. While the LK relay is released as usual at the end of the reading interval during which the last line is recorded or perforated and during the change over from one recorder to the other still the CKE relay 1511 is operated so that this routine test circuit is not closed at this time. Thus, for instance, the message units detail call recorded in the computer during intervals 83 to 88, inclusive, results in an output during interval 90 recorded on a message unit tape and another output perforated during intervals 92 to 96, inclusive, on another output tape. The LK relay is released at the end of interval 90 and reoperated again during interval 91 but the CKE relay 1511 is held locked until the output on the second tape is completed so that the LK relay may be released and reoperated without making the routine test.

Another feature of the invention is a check circuit involving the use of duplicate paths for controlling an operation. It has been pointed out hereinbefore that the laws of statistics show that the likelihood of two duplicate circuits failing simultaneously from like faults is so rare that it may be dismissed from a practical standpoint. Therefore, an instance of such a circuit is illustrated herein by the use of the 2TB relay 1706 and the 2TA relay 1707. Let us assume in this case that the DTLA–B–C relay 1708 is operated and that the call is a message unit detail call involving the operation of the MUDA–B relay 1604 and the DETA–B relay 1606. Therefore, ground is extended over both the armatures 5 and 6 of the RPF relay 1603, thence over the armatures 4 and 5 of the DETA–B relay 1606, the armatures 2 and 4 of the MUDA–B relay 1604 to cause the operation of the 2TA relay 1707 and the 2TB relay 1706. These two relays are, therefore, operated over identical paths and through the operation of the same relays but by separate armatures and contacts of each such relay.

Now, the path for the operation of the CKC check relay 1512 extends from ground over the back contact and armature 1 of the P18D relay 1804 to the PD conductor when one and one only of these perforator register connector relays is operated, through a front contact and armature of the DTLA–B–C relay 1708, armature 2 and front contact of the 2TA relay 1707, front contact and armature 3 of the 2TB relay 1706, the CK2 conductor, the back contact and armature 5 of the CKE relay 1511, the back contact and armature 5 of the E2A–B relay 1515, the back contact and armature 4 of the CKE relay 1511, the back contact and armature 2 of the SCK relay 1506 to the left of the CKC relay 1509. If both the 2TA and 2TB relays had been unoperated, then the PD conductor would have extended over the armature 1 and back contact of the 2TA relay 1707, the back contact and armature 2 of the 2TB relay 1706, the CK1 conductor to the back contact and armature 5 of the E2A–B relay 1515 and thence over the circuit traced to the CKC relay 1512. It thus appears that both the 2TA and the 2TB relays must be operated or that both must be released in order to properly operate the CKC check relay 1512. Should it happen that one of these relays should fail to operate, then both of these paths would be open and the CKC relay could not be falsely operated where its operating path extends through both the front and the back contacts of these relays. If the operation calls for the CKC relay to be operated through the front contacts of the 2TA and the 2TB relays, then it is statistically certain that at least one of these relays will operate even though there may be a trouble which would prevent the other from operating and since it is not likely that the same trouble could keep both from operating, we have this surety that the CKC relay will fail to respond falsely and its operation can be relied upon as proper.

Another of the features of the invention consisting of the combination of the line counting circuit and the means under its control for operating the entry forming relays has been explained hereinabove where it was shown how with the BK2 relay 1703 operated the DN relay 1900 was operated through the PL1 counting relay 1704 and the TMU relay 1903 was operated through the PL2 counting relay 1702.

There may be only a single line in the output or there may be a maximum of nine lines therein in the case of some straddle call information. The PL- relays through the network provided by the group of relays including the BK1, BK2, DTLA and DA relays make an automatic sequential operation of the pattern relays possible. As another example, if it is assumed that the DTLA-B-C relay 1710 is operated, then the first output line perforated upon the operation of the PL1 relay 1704 is formed by the DN pattern relay 1900 and this line will have one in the A digit, the office index in the B digit and the calling line number in the C, D, E and F digits. When this line has been properly perforated then the counting chain will advance and upon the operation of the PL2 relay 1702 the TM relay 1907 will be operated. This is known as the start time line and has zero in the A digit with a code in the B to F digits including the information as to the day, hour and minutes at which the call was started. This line having been successfully perforated and the check made, then the PL3 relay 1711 is operated and this selects and causes the A0 relay 1905 to operate whereupon a line having zero in the A digit, the area index in the B digit, the called number index in the C digit and the called office code in the D, E and F digits. Perforation of this line having been completed the counting chain will advance and the PL4 relay 1712 will operate and cause the operation of the CN relay 1906. This is the called number line and contains zero in the A digit and the called number of five digits in the B to F digits, inclusive. Lastly, the PL5 relay 1713 will operate and cause the operation of the TMU relay 1903 so that a line having zero in the A digit, a message unit index in the B digit, the chargeable time in the C and D digits and the number of message units computed in the E and F digits.

Various other combinations of outputs are formed in a similar manner.

Another of the characteristic features of the invention is a time-saving device by which an operation is caused to occur at the earliest possible instant. There are in the computer a number of registers and it is necessary when these are to be released to make the release as rapid as possible so as to clear the registers, close the down-check circuits and prepare the apparatus for reuse. Generally speaking, this must be done within one of the open intervals between reading intervals and since this open interval is only some 20 milliseconds in duration, the fast operation required is important.

The feature depends on the use of what is known as a cocking relay. There are locking relays which, being operated, act to hold the registers and other parts of the circuit in an operated condition until it is time to release them. When the release is to be effected these locking relays are then deenergized. Since it would take time at the end of a reading interval to operate a relay which in turn would release the locking relay, it is provided that the cocking relay may be operated well in advance of the time at which the locking relay is to be deenergized so as to break the normally closed circuit for holding the locking relay operated and leave this locking relay dependent entirely on the interrupter contact of the reader so that immediately at the end of a reading interval this locking relay may be released.

An instance of this sort of operation may be seen in connection with the LK relay 1504 for it is important that at the end of the last reading interval in which the last output line of an ouput entry is being perforated such, for instance, as the interval 12 in Fig. 23 where the control circuit and the perforator line count circuit must be returned to normal preparatory to the next operation of the LK relay in interval 13, the LK relay must release so as to release entirely the perforator control circuit. Thus, during the perforation of this last line and as explained hereinbefore through the operation of the TMU relay 1903 the last line LL relay 1521 is operated and this relay operates the AV relay 1507. The AV relay through its armature 7 and back contact opens the normal holding circuit of the LK relay 1504 which may be traced here from the winding of the LK relay 1504, the front contact and armature 6 thereof, the resistance 1523, the armature 8 and back contact of the AV relay 1507 and in parallel with this contact a series circuit through the armatures and back contacts of the PS1 relay 1522 and the PS2 relay 1520, thence through the armature 4 and front contact of the LK relay 1504, over the LKA conductor, through the chain circuit of the PLA- relays consisting of the armature and back contact of the unoperated relays such as the PLA8 relay 1708, thence over an armature and front contact of the first operated one of these relays such as the PLA2 relay 1714, the front contact and armature 2 of the operated PL2 relay 1702, thence over a chain circuit including the back contacts and armatures of the remaining PL- relays over the PA conductor, the front contact and armature of the then operated pattern relays such as the TMU relay 1903, the PA1 conductor to the front contact of the PC relay 1519. This PC relay, it has been explained hereinbefore, is operated directly from one of the reader contacts so that it will release immediately at the end of the reading interval. Since the LL relay will operate near the beginning of a reading interval and, therefore, cause the AV relay 1507 to operate, again somewhere near the beginning of a reading interval, it will be realized that this connection in the holding circuit of the LK relay 1504 is opened well in advance of the time the LK relay 1504 is to be released. Therefore, the LK relay releases immediately upon the release of the PC relay 1519. The AV relay may then be looked upon as a cocking relay and the LL relay may be looked upon as a general release relay so that here we have (1) the LK relay consisting of the means for maintaining a circuit locked, (2) a general release relay such as the LL relay, (3) a cocking relay, in this case the AV relay 1507, and (4) a means for operating the cocking relay at a time that the said locking relay is operated so as to place the release of the locking relay under the control of an operated relay whereby it gets the advantage of the release of a relay rather than the operation of a relay which is faster. The difference in timing is only a question of milliseconds but is nevertheless of considerable importance.

The principle herein explained whereby the LL last line general purpose relay operates to cause the operation of the AV relay well in advance of the time the LK relay 1504 is to be released leaving the continued operation of the LK relay dependent only on the timing interval cams of the reader is employed in a number of other instances in the computer, all of which are explained in detail in the said Joel application.

What is claimed is:

1. In combination, a plurality of recorders each having an advance magnet for advancing its record to another recording position, a locking circuit closed by the operation of said advance magnet for holding said magnet operated to prevent the advance of said recorder, an up-check and validity circuit responsive to a valid operation of said recorder for opening said locking circuit to allow the advance of said recorder responsive to a valid operation thereof, a routine test circuit for testing the common circuit for operating the said advance magnets of said recorders, comprising a first relay responsive to the continuity of said common circuit, a second relay operating in series with and to hold said first relay on the break of said common circuit, a start relay operated in response to the conjoint operation of said first and second relays and a locking relay responsive to said start relay for releasing said first and second relays and for providing said locking circuits.

2. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, a plurality of recorders for recording customer charges derived from said registered information, each said recorder having an advance magnet adapted on its release after the energization thereof to advance the tape in said recorder to a new recording position, a holding circuit for locking said advance magnet in operated position, an up-check circuit responsive to a valid operation of said recorder for controlling said holding circuit, a recorder start circuit responsive to said calculator for starting the operation of said recorder, and a routine test circuit for testing the continuity of said locking circuit, said routine test circuit having control over said recorder start circuit, whereby the ability of said holding circuit to prevent the advance of a perforator tape with an incorrect output line recorded therein may be tested prior to the recording of each customer charge.

3. A circuit arrangement for preventing a secondary circuit operation in case of failure in a primary circuit, comprising duplicate primary circuits each terminating in a relay, a secondary circuit having two branches one closed in series through front contacts of said relays and another closed in series through back contacts of said relays, whereby a failure in either of said primary circuits will open both of said secondary circuits.

4. A check circuit depending under different circumstances on the operation or the non-operation of a relay means, said relay means consisting of a pair of relays having front contacts in series in one branch of said check circuit and back contacts in series in another branch of said check circuit, an independent circuit for each of said relays, said independent circuits being duplicates each controlled in the same manner by the same agencies.

5. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of information into customer charges and to issue said charges in billable form, said computer including a plurality of entry forming relays, each responsive to information entered into said computer for controlling the form and contents of the information issued from said computer, a plurality of line forming relays each for relaying information entered into or derived by said computer and gathered from various sources within said computer for forming a single computer output line, said line forming relays being under control of said entry forming relays, and a line counting means for controlling the number of said line forming relays employed.

6. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of information into customer charges and to issue said charges in billable form, said computer including a plurality of entry forming relays, each responsive to information entered into said computer for controlling the form and contents of the information issued from said computer, a plurality of line forming relays each for relaying information entered into or derived by said computer and gathered from various sources within said computer for forming a single computer output line, said line forming relays being under control of said entry forming relays, and a line counting means for controlling the number of said line forming relays employed by the sequence of operation of said line forming relays.

7. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of information into customer charges and to issue said charges in billable form, said computer including a plurality of registers in which various factors are registered, a holding circuit for each said register, said holding circuit including a pair of normally closed contacts, a pair of normally open contacts, means for closing said normally open contacts, means for bridging said normally closed contacts in said holding circuit by said closed pair of normally open contacts, means for thereupon operating said pair of normally closed contacts to open said originally established holding circuit and means for effecting the release of said bridged pair of normally open contacts, thereby to cause the release of a said register.

8. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of information into customer charges and to issue said charges in billable form, said computer including a plurality of registers in which various factors are registered, a holding circuit for each said register, means for cocking a said holding circuit for rapid release of the corresponding said register, consisting of a pair of normally closed contacts, means for bridging said contacts by an operated pair of normally open contacts, means for thereafter but prior to the time for release of said register operating said pair of normally closed contacts to open said originally established holding circuit and means for releasing said operated pair of normally open contacts to release said register.

9. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of information into customer charges and to issue said charges in billable form, said computer including a plurality of registers in which various factors are registered, a holding circuit for each said register, means for cocking a said holding circuit for rapid release of the corresponding said register, consisting of a first relay having a pair of back contacts in said holding circuit, a second relay having a pair of front contacts bridged about said pair of back contacts, means for operating said second relay and means for thereafter operating said first relay to release said register.

10. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of information into customer charges and to issue said charges in billable form, said computer including a plurality of registers in which various factors are registered, a holding circuit for each said register, means for cocking a plurality of said holding circuits for rapid release of a selected number of said registers, consisting of a release relay common to all of said registers for signaling by the release of an operated pair of normally open contacts the exact time for the release of each and every one of said registers which may have been prepared for release, a cocking relay for each of said registers for preparing it for release, said individual cocking relay controlling a locking circuit for its said register to hold it locked regardless of the operation of said release relay, and a selector relay operable during the operating period of said release relay for operating the said cocking relays of a selected and predetermined number of said registers, whereby only those registers which have been cocked will release upon the said signal from said release relay.

ERLON W. FLINT.

References Cited in the file of this patent

UNITED STATES PATENTS

| Number | Name | Date |
|---|---|---|
| 2,176,933 | Smith | Oct. 24, 1939 |
| 2,268,203 | Carpenter et al. | Dec. 30, 1941 |
| 2,386,763 | Williams | Oct. 16, 1945 |
| 2,486,809 | Stibitz | Nov. 1, 1949 |

OTHER REFERENCES

Electrical Remote Control, Dorr and Gulton, pages 57–60, Electronics, Dec. 1942.

Bell Telephone Laboratories' Relay Computing System, S. B. Williams, pages 40–68, Proc. of a Symposium on Large-Scale Digital Calculating Machinery, Harvard Univ. Press, 1948.